United States Patent
Bossen et al.

(10) Patent No.: US 12,058,325 B2
(45) Date of Patent: Aug. 6, 2024

(54) SYSTEMS AND METHODS FOR DERIVING QUANTIZATION PARAMETERS FOR VIDEO BLOCKS IN VIDEO CODING

(71) Applicant: Sharp Kabushiki Kaisha, Sakai (JP)

(72) Inventors: Frank Bossen, Vancouver, WA (US); Christopher Andrew Segall, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 252 days.

(21) Appl. No.: 17/621,575

(22) PCT Filed: Jun. 17, 2020

(86) PCT No.: PCT/JP2020/023854
§ 371 (c)(1),
(2) Date: Dec. 21, 2021

(87) PCT Pub. No.: WO2020/262176
PCT Pub. Date: Dec. 30, 2020

(65) Prior Publication Data
US 2022/0377338 A1 Nov. 24, 2022

Related U.S. Application Data

(60) Provisional application No. 62/904,392, filed on Sep. 23, 2019, provisional application No. 62/871,535, (Continued)

(51) Int. Cl.
*H04N 19/124* (2014.01)
*H04N 19/186* (2014.01)
*H04N 19/70* (2014.01)

(52) U.S. Cl.
CPC ......... *H04N 19/124* (2014.11); *H04N 19/186* (2014.11); *H04N 19/70* (2014.11)

(58) Field of Classification Search
None
See application file for complete search history.

(56) References Cited

U.S. PATENT DOCUMENTS

| 2014/0003497 A1* | 1/2014 | Sullivan | H04N 19/186 375/240.03 |
|---|---|---|---|
| 2020/0029078 A1* | 1/2020 | Pu | H04N 19/124 |

OTHER PUBLICATIONS

Official Communication issued in International Patent Application No. PCT/JP2020/023854, mailed on Aug. 25, 2020.
(Continued)

*Primary Examiner* — Xiaolan Xu
(74) *Attorney, Agent, or Firm* — Keating & Bennett, LLP

(57) ABSTRACT

This disclosure relates to video coding and more particularly to techniques for deriving quantization parameters. In one example, a method of decoding video data comprises: decoding a syntax element specifying a number of points used to describe a quantization parameter mapping table in a parameter set; decoding a quantization parameter mapping table syntax element in the parameter set; and decoding a delta quantization parameter minus one syntax element and a delta quantization parameter syntax element in the parameter set, wherein: a first pivot is set to a value of the quantization parameter mapping table syntax element plus 26, a second pivot is set to a sum of a value of the first pivot and a value of the delta quantization parameter minus one syntax element plus one, and the quantization parameter mapping table is derived by using the second pivot, the syntax element specifying a number of points used to describe the quantization parameter mapping table and the delta quantization parameter syntax element.

4 Claims, 8 Drawing Sheets

Related U.S. Application Data filed on Jul. 8, 2019, provisional application No. 62/866,588, filed on Jun. 25, 2019, provisional application No. 62/865,275, filed on Jun. 23, 2019.

(56) References Cited

OTHER PUBLICATIONS

Ramasubramonian et al., "AHG15: On signalling of chroma QP tables", Joint Video Experts Team (JVET) of ITU-T SG 16 WP 3 and ISO/IEC JTC 1/SC 29/WG 11, JVET-O0650-v4, Jul. 3-12, 2019, pp. 1-4.

Pu et al., "AHG15: chroma quantization parameeters Qpc table", Joint Video Experts Team (JVET) of ITU-T SG 16 WP 3 and ISO/IEC JTC 1/SC 29/WG 11, JVET-O0433, Jul. 3-12, 2019, pp. 1-6.

Ikonin et al., "AHG15: Signalling of chroma Qp mapping table", Joint Video Experts Team (JVET) of ITU-T SG 16 WP 3 and ISO/IEC JTC 1/SC 29/WG 11, JVET-O0186, Jul. 3-12, 2019, pp. 1-9.

Bossen et al., "AHG15: Flexible luma-to-chroma quantization parameter tables", Joint Video Experts Team (JVET) of ITU-T SG 16 WP 3 and ISO/IEC JTC 1/SC 29/WG 11, JVET-O0562-v2, Jul. 3-12, 2019, pp. 1-7.

Bross et al., "Versatile Video Coding (Draft 5)", Joint Video Experts Team (JVET) of ITU-T SG 16 WP 3 and ISO/IEC JTC 1/SC 29/WG 11, JVET-N1001-v8, Mar. 19-27, 2019, 400 pages.

Bross, "Versatile Video Coding (Draft 1)", Joint Video Experts Team (JVET) of ITU-T SG 16 WP 3 and ISO/IEC JTC 1/SC 29/WG 11, JVET-J1001-v2, Apr. 10-20, 2018, 43 pages.

Segall et al., "Joint Call for Proposals on Video Compression with Capability beyond HEVC", Joint Video Exploration Team (JVET) of ITU-T SG 16 WP 3 and ISO/IEC JTC 1/SC 29/WG 11, JVET-H1002 (v6), Oct. 18-24, 2017, 27 bages.

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, 50 pages.

International Telecommunication Union, "Series H: Audiovisual and Multimedia Systems Infrastructure of audiovisual services—Coding of moving video, High efficiency video coding", ITU-T H.265, Jun. 2019, 695 pages.

International Telecommunication Union, "Series H: Audiovisual and Multimedia Systems Infrastructure of audiovisual services—Coding of moving video, Advanced video coding for generic audiovisual services", ITU-T H.264, Jun. 2019, 834 pages.

\* cited by examiner

SYSTEMS AND METHODS FOR DERIVING QUANTIZATION PARAMETERS FOR VIDEO BLOCKS IN VIDEO CODING

CROSS REFERENCE

This Nonprovisional application claims priority under 35 U.S.C. § 119 on provisional Application No. 62/865,275 on Jun. 23, 2019, No. 62/866,588 on Jun. 25, 2019, No. 62/871,535 on Jul. 8, 2019, No. 62/904,392 on Sep. 23, 2019, the entire contents of which are hereby incorporated by reference.

TECHNICAL FIELD

This disclosure relates to video coding and more particularly to techniques for deriving quantization parameters.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10th Meeting of ISO/IEC JTC1/SC29/WG11 16-20 Apr. 2018, San Diego, Calif. From the multiple descriptions of video coding tools, a resulting initial draft text of a video coding specification is described in "Versatile Video Coding (Draft 1)," 10th Meeting of ISO/IEC JTC1/SC29/WG11 16-20 Apr. 2018, San Diego, Calif., document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 5)," 14th Meeting of ISO/IEC JTC1/SC29/WG11 19-27 Mar. 2019, Geneva, CH, document JVET-N1001-v8, which is incorporated by reference herein, and referred to as JVET-N1001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of decoding video data, the method comprising: decoding a syntax element specifying a number of points used to describe a quantization parameter mapping table in a parameter set; decoding a quantization parameter mapping table syntax element in the parameter set; and decoding a delta quantization parameter minus one syntax element and a delta quantization parameter syntax element in the parameter set, wherein: a first pivot is set to a value of the quantization parameter mapping table syntax element plus 26, a second pivot is set to a sum of a value of the first pivot and a value of the delta quantization parameter minus one syntax element plus one, and the quantization parameter mapping table is derived by using the second pivot, the syntax element specifying a number of points used to describe the quantization parameter mapping table and the delta quantization parameter syntax element.

In one example, a method of coding video data, the method comprising: coding a syntax element specifying a number of points used to describe a quantization parameter mapping table in a parameter set; coding a quantization parameter mapping table syntax element in the parameter set; and coding a delta quantization parameter minus one syntax element and a delta quantization parameter syntax element in the parameter set, wherein: a first pivot is set to a value of the quantization parameter mapping table syntax element plus 26, a second pivot is set to a sum of a value of the first pivot and a value of the delta quantization parameter minus one syntax element plus one, and the quantization parameter mapping table is derived by using the second pivot, the syntax element specifying a number of points used to describe the quantization parameter mapping table and the delta quantization parameter syntax element.

In one example, a device for decoding coded data, the device comprising: a processor, and a memory associated with the processor; wherein the processor is configured to perform the following steps: decoding a syntax element specifying a number of points used to describe a quantization parameter mapping table in a parameter set; decoding a quantization parameter mapping table syntax element in the parameter set; and decoding a delta quantization parameter minus one syntax element and a delta quantization parameter syntax element in the parameter set, wherein: a first pivot is set to a value of the quantization parameter mapping table syntax element plus 26, a second pivot is set to a sum of a value of the first pivot and a value of the delta quantization parameter minus one syntax element plus one, and the quantization parameter mapping table is derived by using the second pivot, the syntax element specifying a number of points used to describe the quantization parameter mapping table and the delta quantization parameter syntax element.

In one example, a device for coding video data, the device comprising: a processor, and a memory associated with the processor; wherein the processor is configured to perform the following steps: coding a syntax element specifying a number of points used to describe a quantization parameter mapping table in a parameter set; coding a quantization parameter mapping table syntax element in the parameter set; and coding a delta quantization parameter minus one syntax element and a delta quantization parameter syntax element in the parameter set, wherein: a first pivot is set to a value of the quantization parameter mapping table syntax element plus 26, a second pivot is set to a sum of a value of the first pivot and a value of the delta quantization parameter minus one syntax element plus one, and the quantization parameter mapping table is derived by using the second pivot, the syntax element specifying a number of points used to describe the quantization parameter mapping table and the delta quantization parameter syntax element.

DESCRIPTION OF EMBODIMENTS

Figure 1:
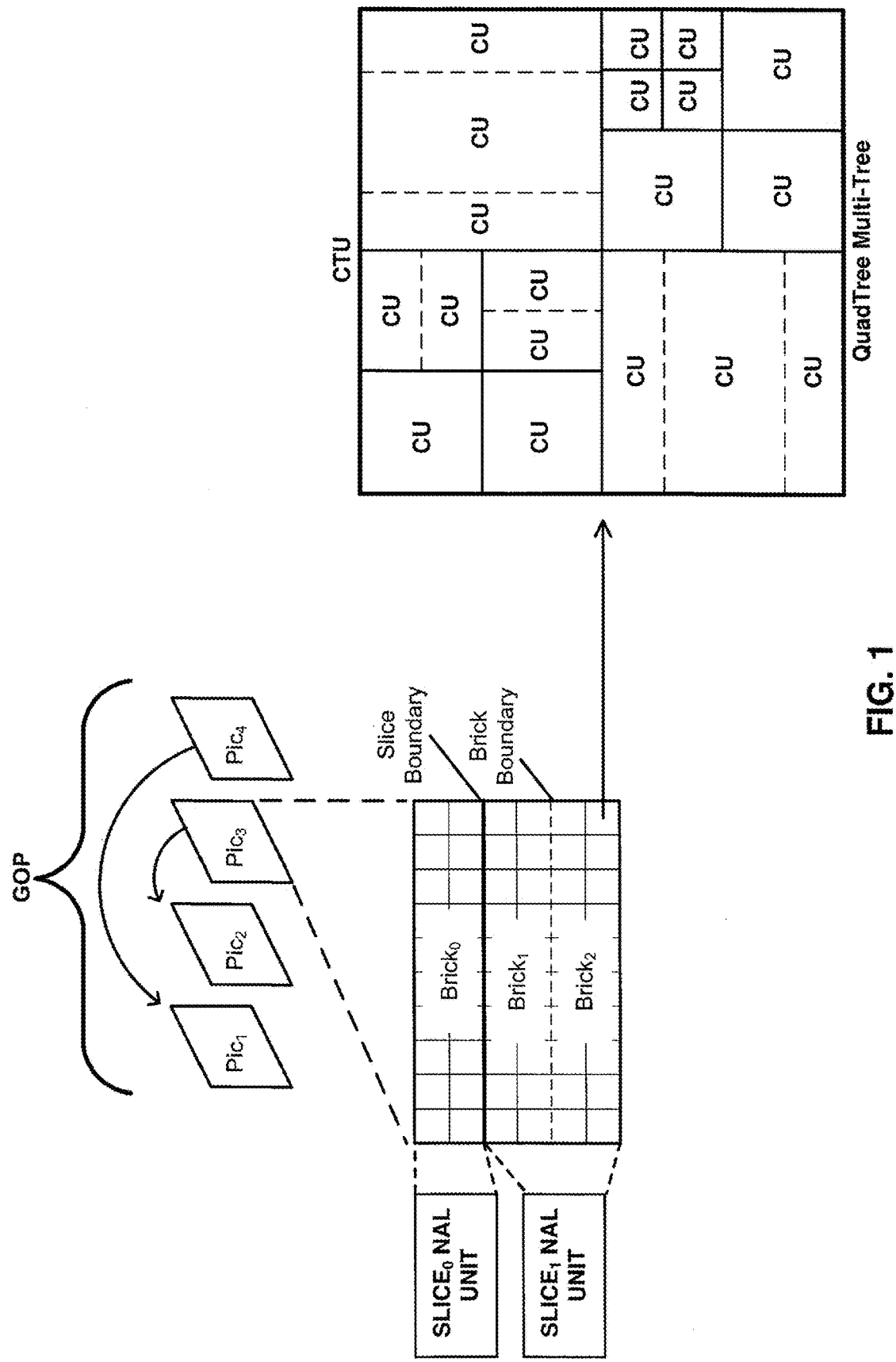
FIG. 1 is a conceptual diagram illustrating an example of a group of pictures coded according to a quad tree multi-tree partitioning in accordance with one or more techniques of this disclosure.

In general, this disclosure describes various techniques for coding video data. In particular, this disclosure describes techniques for deriving quantization parameters. It should be noted that although techniques of this disclosure are described with respect to ITU-T H.264, ITU-T H.265, JEM, and JVET-N1001 the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-N1001. Thus, reference to ITU-T H.264, ITU-T H.265, JEM, and/or JVET-N1001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of coding of video data comprises determining a quantization parameter for a chroma component of a current video block based at least in part on a piece-wise linear function and performing quantization based on the determined quantization parameter.

In one example, a device for coding video data comprises one or more processors configured to determine a quantization parameter for a chroma component of a current video block based at least in part on a piece-wise linear function and perform quantization based on the determined quantization parameter.

In one example, a non-transitory computer-readable storage medium comprises instructions stored thereon that, when executed, cause one or more processors of a device to determine a quantization parameter for a chroma component of a current video block based at least in part on a piece-wise linear function and perform quantization based on the determined quantization parameter.

In one example, an apparatus comprises means for determining a quantization parameter for a chroma component of a current video block based at least in part on a piece-wise linear function and means for performing quantization based on the determined quantization parameter.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may by halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-N1001, CTUs are partitioned according a quadtree plus multi-type tree (QTMT or QT+MTT) structure. The QTMT in JVET-N1001 is similar to the QTBT in JEM. However, in JVET-N1001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge. Referring again to FIG. 1, FIG. 1 illustrates an example of a CTU being partitioned into quadtree leaf nodes and quadtree leaf nodes being further partitioned according to a BT split or a TT split. That is, in FIG. 1 dashed lines indicate additional binary and ternary splits in a quadtree.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-N1001, slices are required to consist of an integer number of bricks instead of only being required to consist of an integer number of CTUs. In JVET-N1001, a brick is a rectangular region of CTU rows within a particular tile in a picture. Further, in JVET-N1001, a tile may be partitioned into multiple bricks, each of which consisting of one or more CTU rows within the tile. A tile that is not partitioned into multiple bricks is also referred to as a brick. However, a brick that is a true subset of a tile is not referred to as a tile. As such, a slice including a set of CTUs which do not form a rectangular region of a picture may or may not be supported in some video coding techniques. Further, it should be noted that in some cases, a slice may be required to consist of an integer number of complete tiles and in this case is referred to as a tile group. The techniques described herein may applicable to bricks, slices, tiles, and/or tile groups. FIG. 1 is a conceptual diagram illustrating an example of a group of pictures including slices. In the example illustrated in FIG. 1, $Pic_3$ is illustrated as including two slices (i.e., $Slice_0$ and $Slice_1$). In the example illustrated in FIG. 1, $Slice_0$ includes one brick, i.e., $Brick_0$ and $Slice_1$ includes two bricks, i.e., $Brick_1$ and $Brick_2$. It should be noted that in some cases, $Slice_0$ and $Slice_1$ may meet the requirements of and be classified as tiles and/or tile groups.

Figure 3:
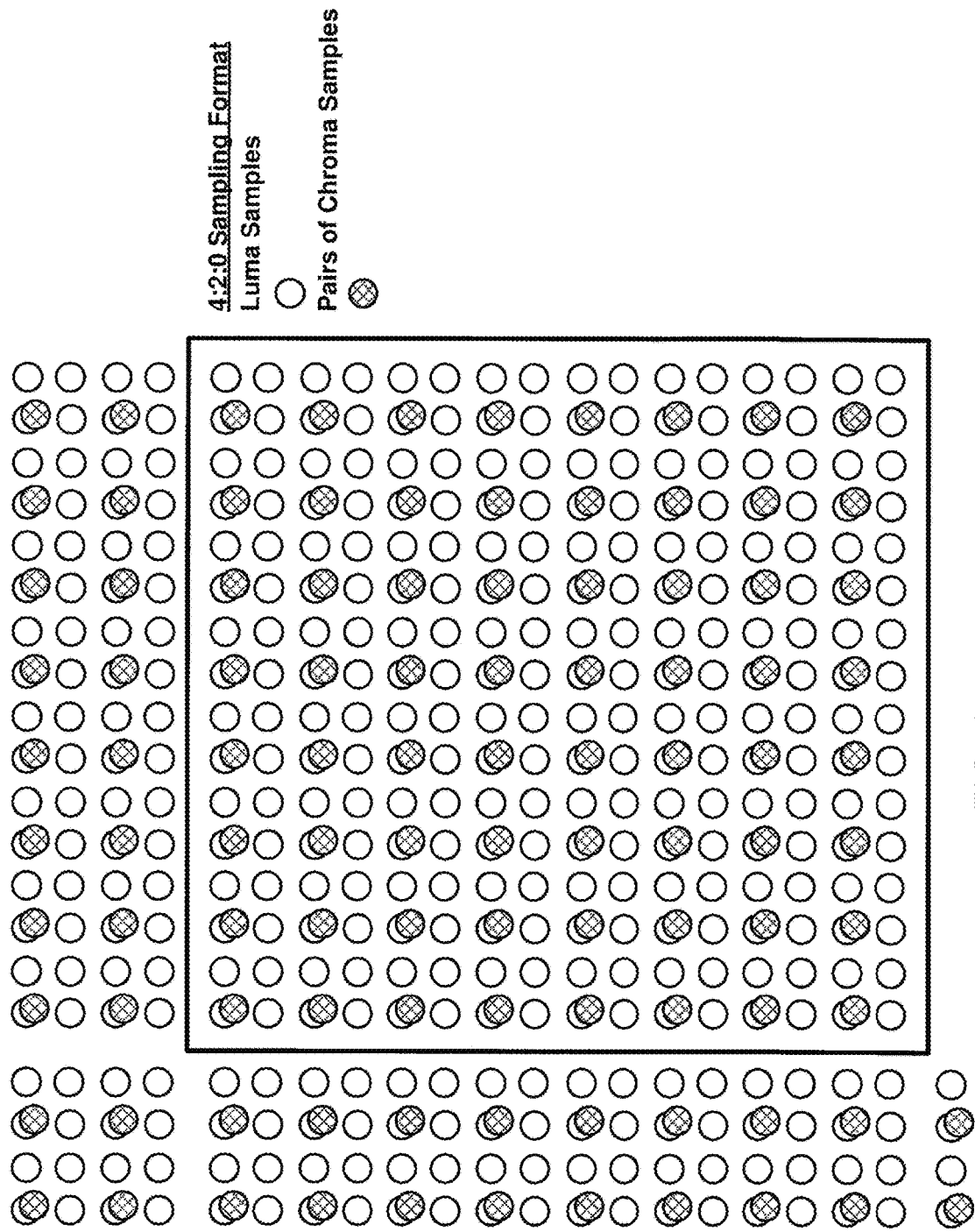
FIG. 3 is a conceptual diagram illustrating an example of a video component sampling format that may be utilized in accordance with one or more techniques of this disclosure.

A video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 3 is a conceptual diagram illustrating an example of a coding unit formatted according to a 4:2:0 sample format. FIG. 3 illustrates the relative position of chroma samples with respect to luma samples within a CU. As described above, a CU is typically defined according to the number of horizontal and vertical luma samples. Thus, as illustrated in FIG. 3, a 16×16 CU formatted according to the 4:2:0 sample format includes 16×16 samples of luma components and 8×8 samples for each chroma component. Further, in the example illustrated in FIG. 3, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 1, $Pic_3$ is illustrated as referencing $Pic_2$. Similarly, $Pic_4$ is illustrated as referencing $Pic_1$. With respect to FIG. 1 assuming the picture number corresponds to the decoding order the DPB would be populated as follows: after decoding $Pic_1$, the DPB would include $\{Pic_1\}$; at the onset of decoding $Pic_2$, the DPB would include $\{Pic_1\}$; after decoding $Pic_2$, the DPB would include $\{Pic_1, Pic_2\}$; at the onset of decoding $Pic_3$, the DPB would include $\{Pic_1, Pic_2\}$. $Pic_3$ would then be decoded with reference to $Pic_2$ and after decoding $Pic_3$, the DPB would include $\{Pic_1, Pic_2, Pic_3\}$. At the onset of decoding $Pic_4$, pictures $Pic_2$ and $Pic_3$ would be marked for removal from the DPB, as they are not needed for decoding $Pic_4$ (or any subsequent pictures, not shown) and assuming $Pic_2$ and $Pic_3$ have been output, the DPB would be updated to include $\{Pic_1\}$. $Pic_4$ would then be decoded with referencing $Pic_1$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-N1001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:

\+ Addition

− Subtraction

\* Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended.
x % y Modulus. Remainder of x divided by y, defined only for integers x and y with x>=0 and y>0.
Further, the following logical operators may be used:
x && y Boolean logical "and" of x and y
x||y Boolean logical "or" of x and y
! Boolean logical "not"
x ? y:z If x is TRUE or not equal to 0, evaluates to the value of y; otherwise, evaluates to the value of z.
Further, the following relational operators may be used:
> Greater than
>= Greater than or equal to
< Less than
<= Less than or equal to
== Equal to
!= Not equal to
Further, the following bit-wise operators may be used:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ A Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.
Further, the following assignment operators may be used:
= Assignment operator
++ Increment, i.e., x++ is equivalent to x=x+1; when used in an array index, evaluates to the value of the variable prior to the increment operation.
−− Decrement, i.e., x−− is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).
−= Decrement by amount specified, i.e., x−=3 is equivalent to x=x−3, and x−=(−3) is equivalent to x=x−(−3).

Further, the following defined mathematical functions may be used:

$$Abs(x) = \begin{cases} x; & x >= 0 \\ -x; & x < 0 \end{cases}$$

Ceil(x) the smallest integer greater than or equal to x.
Floor(x) the largest integer less than or equal to x.
Log2(x) the base-2 logarithm of x.

$$Min(x, y) = \begin{cases} x; & x <= y \\ y; & x < y \end{cases}$$

$$Max(x, y) = \begin{cases} x; & x >= y \\ y; & x < y \end{cases}$$

Further, it should be noted that in the syntax descriptors used herein, the following descriptors may be applied:
b(8): byte having any pattern of bit string (8 bits). The parsing process for this descriptor is specified by the return value of the function read_bits(8).
f(n): fixed-pattern bit string using n bits written (from left to right) with the left bit first. The parsing process for this descriptor is specified by the return value of the function read_bits(n).
se(v): signed integer 0-th order Exp-Golomb-coded syntax element with the left bit first.
tb(v): truncated binary using up to maxVal bits with maxVal defined in the semantics of the symtax element.
tu(v): truncated unary using up to maxVal bits with maxVal defined in the semantics of the symtax element.
u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.
ue(v): unsigned integer 0-th order Exp-Golomb-coded syntax element with the left bit first.
read_bits(n) reads the next n bits from the bitstream and advances the bitstream pointer by n bit positions. When n is equal to 0, read_bits(n) is specified to return a value equal to 0 and to not advance the bitstream pointer.

Figure 2A:
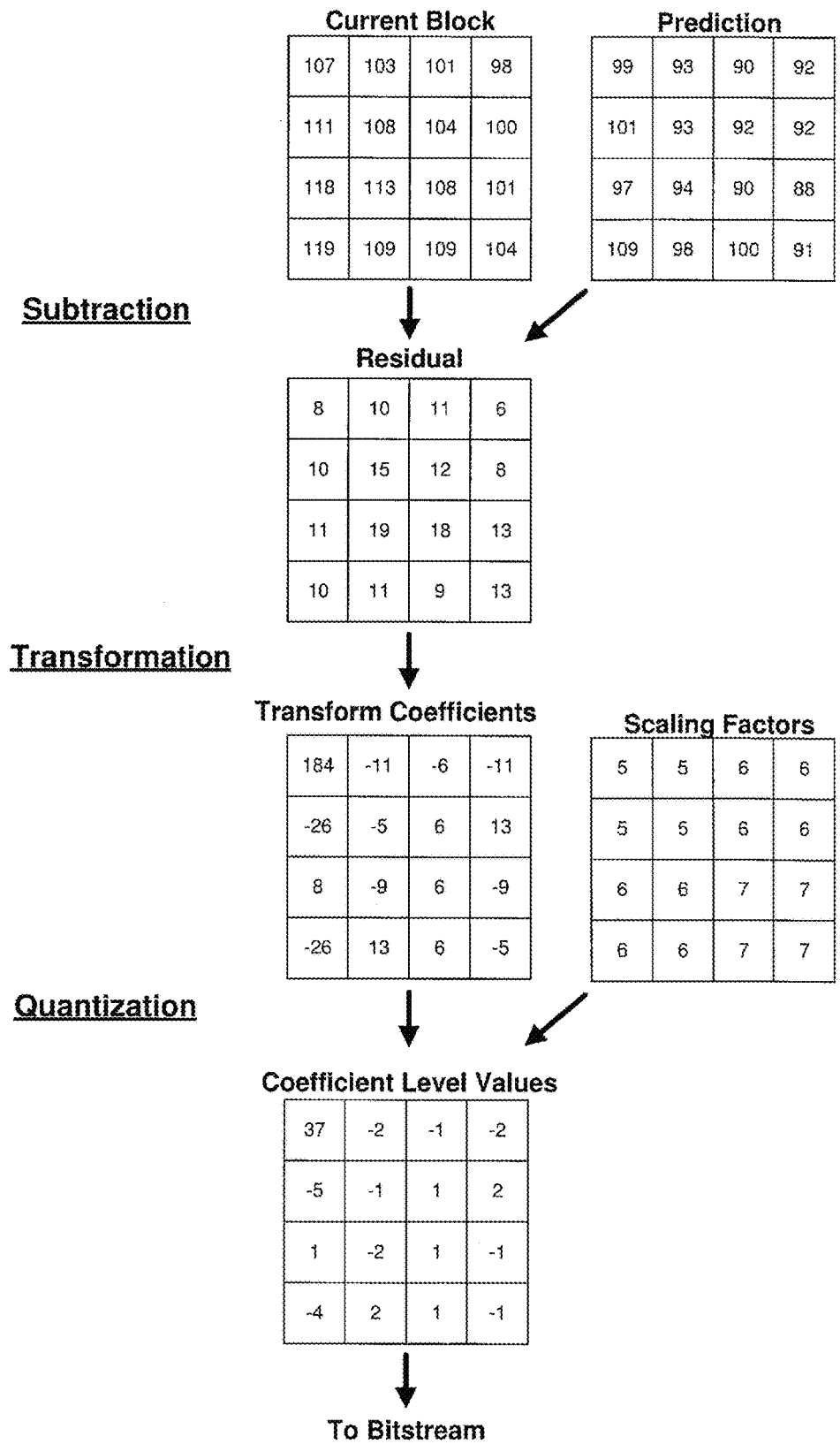
FIG. 2A is a conceptual diagram illustrating example of coding a block of video data in accordance with one or more techniques of this disclosure.
Figure 2B:
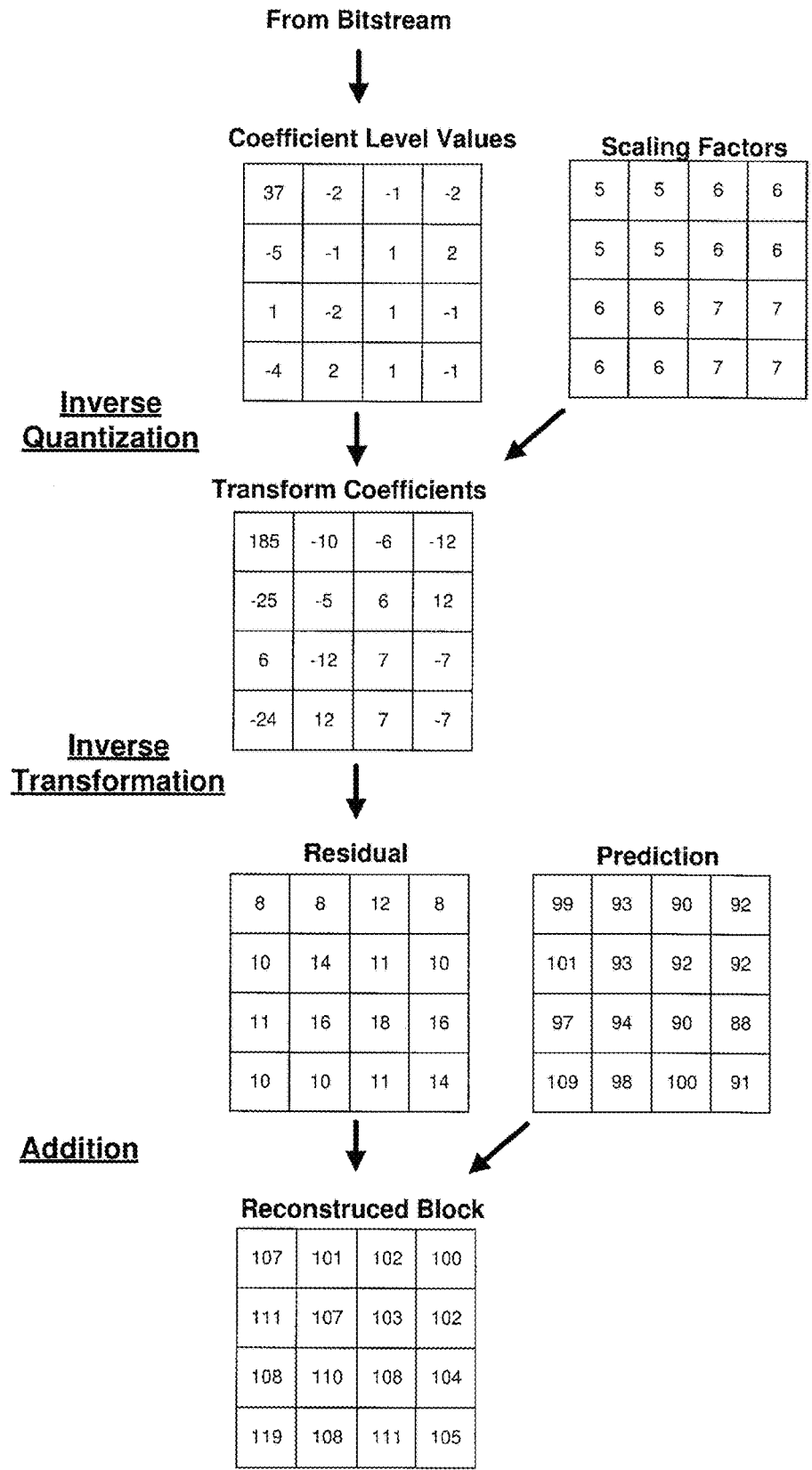
FIG. 2B is a conceptual diagram illustrating example of coding a block of video data in accordance with one or more techniques of this disclosure.

FIGS. 2A-2B are conceptual diagrams illustrating examples of coding a block of video data. As illustrated in FIG. 2A, a current block of video data (e.g., a CB corresponding to a video component) is encoded by generating a residual by subtracting a set of prediction values from the current block of video data, performing a transformation on the residual, and quantizing the transform coefficients to generate level values. The level values are coded into a bitstream. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In this manner, coding may said to be lossy. However, the difference in sample values may be considered acceptable or imperceptible to a viewer of the reconstructed video.

Further, as illustrated in FIGS. 2A-2B, coefficient level values are generated using an array of scaling factors. In ITU-T H.265, an array of scaling factors is generated by selecting a scaling matrix and multiplying each entry in the scaling matrix by a quantization scaling factor. In ITU-T H.265, a scaling matrix is selected based in part on a prediction mode and a color component, where scaling matrices of the following sizes are defined: 4×4, 8×8, 16×16, and 32×32. It should be noted that in some examples, a scaling matrix may provide the same value for each entry (i.e., all coefficients are scaled according to a single value). The value of a quantization scaling factor, may be determined by a quantization parameter, QP. In ITU-T H.265, for a bit-depth of 8-bits, the QP can take 52 values from 0 to 51 and a change of 1 for QP generally corresponds to a change in the value of the quantization scaling factor by approximately 12%. It should be noted that more generally, in ITU-T H.265, the valid range of QP values for a source bit-depth is: −6*(bitdepth-8) to +51 (inclusive). Thus, for example, in the case where the bit-depth is 10-bits, QP can take 64 values from −12 to 51, which may be mapped to values 0 to 63 during dequantization.

Further, in ITU-T H.265, a QP value for a set of transform coefficients may be derived using a predictive quantization parameter value (which may be referred to as a predictive QP value or a QP predictive value) and an optionally signaled quantization parameter delta value (which may be referred to as a QP delta value or a delta QP value). In ITU-T H.265, a quantization parameter may be updated for each CU and a respective quantization parameter may be derived for each of the luma and chroma channels. In ITU-T H.265, for a current CU, a predictive QP value is inherited for the CU (i.e., a QP signaled at the slice level or a QP from a previous CU) and a delta QP value may be optionally signaled for each TU within the CU. For the luma channel, the QP for each luma TB is the sum of the predictive QP value and any signaled delta QP value. Further, for most profiles in ITU-T H.265, for the chroma channels of the current CU, the chroma QP is a function of the QP determined for the luma channel and chroma QP offsets signaled in a slice header and/or chroma QP offsets signaled a picture parameter set (PPS).

As described above, in ITU-T H.265, a delta QP value may be optionally signaled for each TU within the CU. In particular, in ITU-T H.265, a quantization group size is used to determine if a delta QP can be signaled for a particular TU. For example, a video encoder may select a CTU size of 64×64 and a quantization group size of 32×32. In this case, if the CTU is partitioned into four 32×32 CUs having respective 32×32 TUs, then a delta QP may be signaled for each TU. However, if the four 32×32 CUs are further partitioned into smaller TUs (e.g., 8×8, 16×16), then a delta QP is only sent for the first 8×8 TU in each 32×32 CU region. It should be noted that in ITU-T H.265, the TU structure aligns TBs for each luma and chroma channels. That is, in ITU-T H.265, a TB for a component (e.g., a chroma component) directly corresponds to a TB of another component. In ITU-T H.265, a difference value is signaled in the PPS (i.e., syntax element diff_cu_qp_delta_depth) to indicate the difference between the luma CTB size and the quantization group size. For example, if the CTB size is 64×64 and the quantization group size is 16×16, a difference value (in logarithmic notation) is signaled to indicate the quantization group size. It should be noted that in ITU-T H.265, a quantization group is always square.

The dequantization process defined in ITU-T H.265 for each entry in an x by y array may be summarized as follows:

$$d[x][y]=((\text{TransCoeffLevel}[x][y]*m[x][y]*\text{levelScale}[qP\%6]<<(qP/6))+(1<<(bd\text{Shift}-1)))>>bd\text{Shift}$$

where
 d[x][y] is a resulting transform coefficient;
 TransCoeffLevel[x][y] is a coefficient level value;
 m[x][y] is a scaling matrix;
 levelScale[k]={40, 45, 51, 57, 64, 72} with k=0 . . . 5;
 qP is the quantization parameter;
 bdShift=BitDepth+Log 2(nTbS)+10;
 BitDepth is the bit depth of the corresponding component; and
 nTbS specifies the size of the corresponding transform block.

It should be noted that the transform coefficient at d[0][0] may be referred to as the DC transform coefficient and the other transform coefficients in the array may be referred to as the AC transform coefficients in some cases (e.g., for DCT).

As described above, in ITU-T H.265, for the luma component, the QP for each luma TB is the sum of the predictive QP value and any signaled delta QP value. In particular, for a current CU, a video decoder may derive the value of the luma QP based on a prediction derived from the QP values of neighboring CUs. That is, in ITU-T H.265, the luma QP, $Qp'_Y$, is derived as follows:

$$Qp'_Y=Qp_Y+QpBd\text{Offset}_Y;$$

where $$Qp_Y=((qP_{Y\_PRED}+CuQp\text{DeltaVal}+52+2*QpBd\text{Offset}_Y)\%(52+QpBd\text{Offset}_Y))-QpBd\text{Offset}_Y;$$

where $$qP_{Y\_PRED}=(qP_{Y\_A}+qP_{Y\_B}+1)>>1;$$

where
 $qP_{Y\_A}$ in most cases, is set equal to the $Qp_Y$ of the coding unit to the left of the current CU;
 $qP_{Y\_B}$ in most cases, is set equal to the $Qp_Y$ of the coding unit above the current CU;
where $$CuQp\text{DeltaVal}=cu\_qp\_delta\_abs*(1-2*cu\_qp\_delta\_sign\_flag);$$

where
 cu_qp_delta_abs is a syntax element that is conditionally included in a bitstream at the Transform Unit Level that specifies the absolute value of the difference CuQpDeltaVal between the luma quantization parameter of the current coding unit and its prediction.
 cu_qp_delta_sign_flag is a syntax element that is conditionally included in a bitstream at the Transform Unit Level that specifies the sign of CuQpDeltaVal as follows:
  If cu_qp_delta_sign_flag is equal to 0, the corresponding CuQpDeltaVal has a positive value.
  Otherwise (cu_qp_delta_sign_flag is equal to 1), the corresponding CuQpDeltaVal has a negative value.
where $$QpBd\text{Offset}_Y=6*bit\_depth\_luma\_minus8;$$

where
 bit_depth_luma_minus8 is a syntax element included in a bitstream at the sequence level that specifies the value of the luma quantization parameter range offset QpBdOffsetY and shall be in the range of 0 to 8, inclusive.
 It should be noted that, in some cases, $qP_{Y\_A}$ and $qP_{Y\_B}$ may be set equal to a variable $qP_{Y\_PREV}$, for example, when a neighboring block is unavailable. In ITU-T H.265, $qP_{Y\_PREV}$ is set equal to the QpY of the last coding unit in the previous quantization group in decoding order or is set equal to SliceQp$_Y$, which is determined based on the syntax element slice_qp_delta signaled in the bitstream at the slice header, where slice_qp_delta specifies the initial value of QpY to be used for the coding blocks in the slice until modified by the value of CuQpDeltaVal in the coding unit layer. The initial value of the QpY quantization parameter for the slice, SliceQpY, is derived as follows:

$$SliceQpY=26+init\_qp\_minus26+slice\_qp\_delta$$

The value of SliceQpY shall be in the range of −QpBdOffsetY to +51, inclusive.

In JVET-N1001, the quantization process is based on the quantization process provided in ITU-T H.265. That is, the value of a quantization scaling factor, may be determined by a quantization parameter, QP. In particular, JVET-N1001 provides the following derivation process for quantization parameters:

Inputs to this process are:
a luma location (xCb, yCb) specifying the top-left luma sample of the current coding block relative to the top-left luma sample of the current picture,
a variable cbWidth specifying the width of the current coding block in luma samples,
a variable cbHeight specifying the height of the current coding block in luma samples,
a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter Qp'$_Y$ and the chroma quantization parameters Qp'$_{Cb}$ and Qp'$_{Cr}$ are derived.

The luma location (xQg, yQg), specifies the top-left luma sample of the current quantization group relative to the top left luma sample of the current picture. The horizontal and vertical positions xQg and yQg are set equal to CuQgTopLeftX and CuQgTopLeftY, respectively.

NOTE—: The current quantization group is a rectangular region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable$_{evPREV}$ is derived as follows:
   If one or more of the following conditions are true, $qP_{Y\_PREV}$ is set equal to SlieeQpy:
      The current quantization group is the first quantization group in a slice.
      The current quantization group is the first quantization group in a brick.
   Otherwise, $qP_{Y\_PREV}$ is set equal to the luma quantization parameter Qp$_Y$ of the last luma coding unit in the previous quantization group in decoding order.

2. The availability derivation process for a block is invoked with the location (xCurr, yCurr) set equal to (xCb, yCb) and the neighbouring location (xNbY, yNbY) set equal to (xQg−1, yQg) as inputs, and the output is assigned to availableA. The variable $qP_{Y\_A}$ is derived as follows:

If one or more of the following conditions are true, $qP_{Y\_A}$ is set equal to $qP_{Y\_PREV}$:
   availableA is equal to FALSE.
   the CTB address ctbAddrA of the CTB containing the luma coding block covering the luma location (xQg−1, yQg) is not equal to CtbAddrinBs, where ctbAddrA is derived as follows:

$x$Tmp=($x$Qg−1)>>MinTbLog2Size$Y$ $y$Tmp=$y$Qg>>MinTbLog2Size$Y$ minTbAddr$A$=MinTbAddrZs[$x$Tmp][$y$Tmp]

ctbAddr$A$=minTbAddr$A$>>(2*(CtbLog2Size$Y$−MinTbLog2Size$Y$))

Otherwise, $qP_{Y\_A}$ is set equal to the luma quantization parameter Qp$_Y$ of the coding unit containing the luma coding block covering (xQg−1, yQg).

3. The availability derivation process for a block as specified is invoked with the location (xCurr, yCurr) set equal to (xCb, yCb) and the neighbouring location (xNbY, yNbY) set equal to (xQg, yQg−1) as inputs, and the output is assigned to availableB. The variable $qP_{Y\_B}$ is derived as follows:

If one or more of the following conditions are true, $qP_{Y\_B}$ is set equal to $qP_{Y\_PREV}$:
   availableB is equal to FALSE.
   the CTB address ctbAddrB of the CTB containing the luma coding block covering the luma location (xQg, yQg−1) is not equal to CtbAddrinBs, where ctbAddrB is derived as follows:

$x$Tmp=$x$Qg>>MinTbLog2Size$Y$ $y$Tmp=($y$Qg−1)>>MinTbLog2Size$Y$ minTbAddr$B$=MinTbAddrZs[$x$Tmp][$y$Tmp]

ctbAddr$B$=minTbAddr$B$>>(2*(CtbLog2Size$Y$−MinTbLog2Size$Y$))

Otherwise, $qP_{Y\_B}$ is set equal to the luma quantization parameter Qp$_Y$ of the coding unit containing the luma coding block covering (xQg, yQg−1).

4. The predicted luma quantization parameter $qP_{Y\_PRED}$ is derived as follows:
   If all the following conditions are true, then $qP_{Y\_PRED}$ is set equal to the luma quantization parameter Qp$_Y$ of the coding unit containing the luma coding block covering (xQg, yQg−1):
      availableB is equal to TRUE.
      the current quantization group is the first quantization group in a CTB row within a tile
   Otherwise, $qP_{Y\_PRED}$ is derived as follows:

$$qP_{Y\_PRED}=(qP_{Y\_A}+qP_{Y\_B}+1)>>1$$

The variable Qp$_Y$ is derived as follows:

$$Qp_Y=((qP_{Y\_PRED}+CuQp\text{DeltaVal}+64+2*QpBd\text{Offset}_Y)\%(64+QpBd\text{Offset}_Y))-QpBd\text{Offset}_Y$$

The luma quantization parameter Qp'y is derived as follows:

$$Qp'_Y=Qp_Y+QpBd\text{Offset}_Y$$

When ChromaArrayType is not equal to 0 and treeType is equal to SINGLE_TREE or DUALTREE_CHROMA, the following applies:
   When treeType is equal to DUAL_TREE_CHROMA, the variable Qp$_Y$ is set equal to the luma quantization parameter $Qp_Y$ of the luma coding unit that covers the luma location (xCb+cbWidth/2, yCb+cbHeight/2).

The variables $qP_{Cb}$, $qP_{Cr}$, and $qP_{CbCr}$ are derived as follows:

$qPi_{Cb}$=Clip3($-QpBd$Offset$_C$,69,$Qp_Y$+pps_cb_qp_offset+slice_cb_qp_offset)

$qPi_{Cr}$=Clip3($-QpBd$Offset$_C$,69,$Qp_Y$+pps_cr_qp_offset+slice_cr_qp_offset)

$qPi_{CbCr}$=Clip3($-QpBd$Offset$_C$,69,$Qp_Y$+pps_joint_cbcr_qp_offset+slice_joint_cbcr_qp_offset)

If ChromaArrayType is equal to 1, the variables $qP_{Cb}$, $qP_{Cr}$, and $qP_{CbCr}$ are set equal to the value of $Qp_C$ as specified in Table 1 based on the index qPi equal to $qP_{Cb}$, $qP_{Cr}$, and $qP_{CbCr}$, respectively.

Otherwise, the variables $qP_{Cb}$, $qP_{Cr}$, and $qP_{CbCr}$ are set equal to Min(qPi, 63), based on the index qPi equal to $qP_{Cb}$, $qP_{Cr}$, and $qP_{CbCr}$, respectively.

The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb}$=$qP_{Cb}$+$QpBd$Offset$_C$ $Qp'_{Cr}$=$qP_{Cr}$+$QpBd$Offset$_C$ $Qp'_{CbCr}$=$qP_{CbCr}$+$QpBd$Offset$_C$

TABLE 1

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

Where, the variable $SliceQp_Y$, $QpBd$Offset$_Y$, and $QpBd$Offset$_C$ are determined based on the following semantics provided in JVET-N1001:

init_qp_minus26 plus 26 specifies the initial value of $SliceQp_Y$ for each slice referring to the PPS. The initial value of $SliceQp_Y$ is modified at the slice layer when a non-zero value of slice_qp_delta is decoded. The value of init_qp_minus26 shall be in the range of −(26+$QpBd$Offset$_Y$) to +37, inclusive.

bit_depth_luma_minus8 specifies the bit depth of the samples of the luma array BitDepth$_Y$ and the value of the luma quantization parameter range offset $QpBd$Offset$_Y$ as follows:

BitDepth$_Y$=8+bit_depth_luma_minus8

$QpBd$Offset$_Y$=6*bit_depth_luma_minus8 bit_depth_luma_minus8 shall be in the range of 0 to 8, inclusive.

bit_depth_chroma_minus8 specifies the bit depth of the samples of the chroma arrays BitDepth$_C$ and the value of the chroma quantization parameter range offset $QpBd$Offset$_C$ as follows:

BitDepth$_C$=8+bit_depth_chroma_minus8

$QpBd$Offset$_C$=6*bit_depth_chroma_minus8 bit_depth_chroma_minus8 shall be in the range of 0 to 8, inclusive.

Where, the variable CuQpDeltaVal is determined based on the following semantics provided in JVET-N1001:

cu_qp_delta_enabled_flag equal to 1 specifies that the cu_qp_delta_subdiv syntax element is present in the PPS and that cu_qp_delta_abs may be present in the transform unit syntax. cu_qp_delta_enabled_flag equal to 0 specifies that the cu_qp_delta_subdiv syntax element is not present in the PPS and that cu_qp_delta_abs is not present in the transform unit syntax.

cu_qp_delta_subdiv specifies the maximum cbSubdiv value of coding units that convey cu_qp_delta_abs and cu_qp_delta_sign_flag. The value range of cu_qp_delta_subdiv is specified as follows:

If slice_type is equal to I, the value of cu_qp_delta_subdiv shall be in the range of 0 to 2*(log2_ctu_size_minus2−log2_min_qt_size_intraslice_minus2+MaxMtt-DepthY), inclusive.

Otherwise (slice_type is not equal to I), the value of cu_qp_delta_subdiv shall be in the range of 0 to 2*(log2_ctu_size_minus2−log2_min_qt_size_inter_slice_minus2+MaxMtt-DepthY), inclusive.

When not present, the value of cu_qp_delta_subdiv is inferred to be equal to 0.

cu_qp_delta_abs specifies the absolute value of the difference CuQpDeltaVal between the quantization parameter of the current coding unit and its prediction.

cu_qp_delta_sign_flag specifies the sign of CuQpDeltaVal as follows:

If cu_qp_delta_sign_flag is equal to 0, the corresponding CuQpDeltaVal has a positive value.

Otherwise (cu_qp_delta_sign_flag is equal to 1), the corresponding CuQpDeltaVal has a negative value.

When cu_qp_delta_sign_flag is not present, it is inferred to be equal to 0.

When cu_qp_delta_abs is present, the variables IsCuQpDeltaCoded and CuQpDeltaVal are derived as follows:

$IsCuQp$DeltaCoded=1

$CuQp$DeltaVal=cu_qp_delta_abs*(1−2*cu_qp_delta_sign_flag)

The value of CuQpDeltaVal shall be in the range of −(32+QpBdOffsetY/2) to +(31+QpBdOffsetY/2), inclusive.

Further, JVET-N1001 provides the following syntax elements specifying quantization parameter information:

In the Picture Parameter Set syntax:

pps_cb_qp_offset and pps_cr_qp_offset specify the offsets to the luma quantization parameter $Qp'_Y$ used for deriving $Qp'_{Cb}$ and $Qp'_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value.

pps_joint_cbcr_qp_offset specifies the offset to the luma quantization parameter $Qp'_Y$ used for deriving $Qp'_{CbCr}$. The value of pps_joint_cbcr_qp_offset shall be in the range of −12 to +12, inclusive. When ChromaArrayType is equal to 0, pps_joint_cbcrqp_offset is not used in the decoding process and decoders shall ignore its value.

pps_slice_chroma_qp_offsets_present_flag equal to 1 indicates that the slice_cb_qp_offset and slice_cr_qp_offset syntax elements are present in the associated slice headers.

pps_slice_chroma_qp_offsets_present_flag equal to 0 indicates that these syntax elements are not present in the associated slice headers. When ChromaArrayType is equal to 0, pps_slice_chroma_qp_offsets_present_flag shall be equal to 0.

In the Slice Header sytnax:

slice_qp_delta specifies the initial value of $Qp_Y$ to be used for the coding blocks in the slice until modified by the value of CuQpDeltaVal in the coding unit layer. The initial value of the $Qp_Y$ quantization parameter for the slice, $SliceQp_Y$, is derived as follows:

$$SliceQp_Y = 26 + \text{init\_qp\_minus26} + \text{slice\_qp\_delta}$$

The value of $SliceQp_Y$ shall be in the range of $-QpBdOffset_Y$ to $+63$, inclusive.

slice_cb_qp_offset specifies a difference to be added to the value of pps_cb_qp_offset when determining the value of the $Qp'_{Cb}$ quantization parameter. The value of slice_cb_qp_offset shall be in the range of −12 to +12, inclusive. When slice_cb_qp_offset is not present, it is inferred to be equal to 0. The value of pps_cb_qp_offset+slice_cb_qp_offset shall be in the range of −12 to +12, inclusive.

slice_cr_qp_offset specifies a difference to be added to the value of pps_cr_qp_offset when determining the value of the $Qp'_{Cr}$ quantization parameter. The value of slice_cr_qp_offset shall be in the range of −12 to +12, inclusive. When slice_cr_qp_offset is not present, it is inferred to be equal to 0. The value of pps_cr_qp_offset+slice_cr_qp_offset shall be in the range of −12 to +12, inclusive.

slice_joint_cbcr_qp_offset specifies a difference to be added to the value of pps_joint_cbcrqp_offset when determining the value of the $Qp'_{CbCr}$. The value of slice_joint_cbcr_qp_offset shall be in the range of −12 to +12, inclusive. When slice_joint_cbcr_qp_offset is not present, it is inferred to be equal to 0. The value of pps_joint_cbcr_qp_offset+slice_joint_cbcr_qp_offset shall be in the range of −12 to +12, inclusive.

As described above, in JVET-N1001, binary and ternary splits may result in non-square rectangular CUs and the luma channel and chroma channels may be partitioned according to a shared QTMT in some cases and separates QTMT in some cases. It should be noted that the above quantization parameter derivation process for JVET-N1001 addresses these considerations, which are not applicable in ITU-T H.265. However, it should be noted that in the above quantization parameter derivation process for JVET-N1001, using Table 1 for deriving a $Qp_C$ value may be less than ideal. According to this disclosure, techniques are described for increasing the flexibility of deriving quantization parameters.

Figure 4:
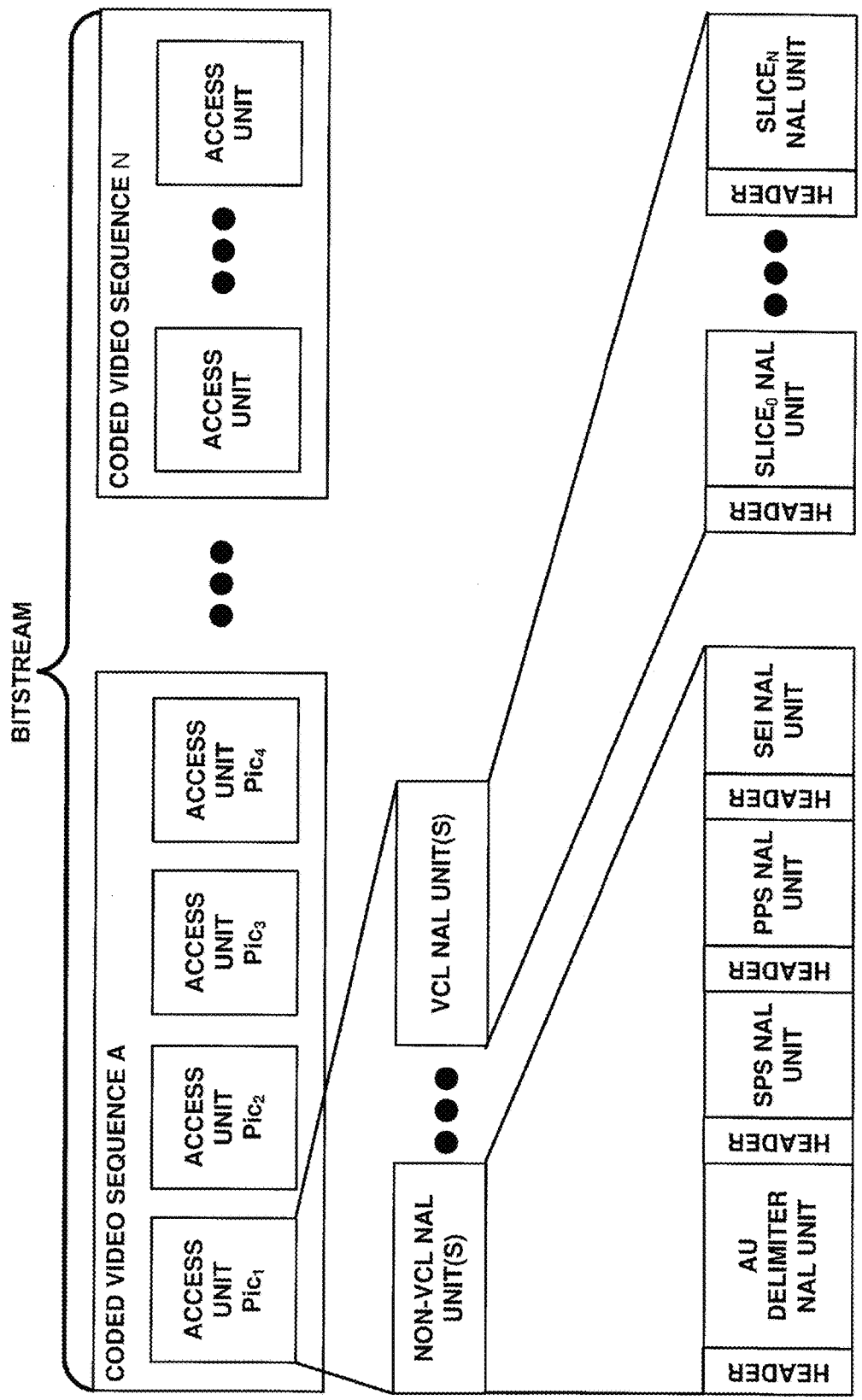
FIG. 4 is a conceptual diagram illustrating a data structure encapsulating coded video data and corresponding metadata according to one or more techniques of this disclosure.

Referring to the example illustrated in FIG. 1, each slice of video data included in $Pic_3$ (i.e., $Slice_0$ and $Slice_1$) is illustrated as being encapsulated in a NAL unit. In JVET-N1001, each of a video sequence, a GOP, a picture, a slice, and CTU may be associated with metadata that describes video coding properties. JVET-N1001 defines parameter sets that may be used to describe video data and/or video coding properties. In particular, JVET-N1001 includes the following five types of parameter sets: decoding parameter set (DPS), video parameter set (VPS), sequence parameter set (SPS), picture parameter set (PPS), and adaption parameter set (APS). In JVET-N1001, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. Further, JVET-N1001 enables supplemental enhancement information (SEI) messages to be signaled. In JVET-N1001, SEI messages assist in processes related to decoding, display or other purposes, however, SEI messages may not be required for constructing the luma or chroma samples by the decoding process. In JVET-N1001, SEI messages may be signaled in a bitstream using non-VCL NAL units. Further, SEI messages may be conveyed by some means other than by being present in the bitstream (i.e., signaled out-of-band). FIG. 4 illustrates an example of a bitstream including multiple CVSs, where a CVS is represented by NAL units included in a respective access unit. In the example illustrated in FIG. 4, non-VCL NAL units include respective parameter set NAL units (i.e., Sequence Parameter Sets (SPS), and Picture Parameter Set (PPS) NAL units), an SEI message NAL unit, and an access unit delimiter NAL unit. It should be noted that in FIG. 4, HEADER is a NAL unit header.

As described above, JVET-N1001 provides syntax elements pps_cb_qp_offset, pps_cr_qp_offset, pps_joint_cbcr_qp_offset, and pps_slice_chroma_qp_offsets_present_flag in the parameter set syntax specifying quantization parameter information. Table 2 illustrates the picture parameter set syntax provided in JVET-N1001.

| | Descriptor |
|---|---|
| pic_parameter_set_rbsp( ) { | |
|   pps_pic_parameter_set_id | ue(v) |
|   pps_seq_parameter_set_id | ue(v) |
|   output_flag_present_flag | u(1) |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     brick_splitting_present_flag | u(1) |
|     for( i = 0; brick_splitting_present_flag && i < NumTilesInPic; i++ ) { | |
|       brick_split_flag[ i ] | u(1) |

-continued

| | Descriptor |
|---|---|
|     if( brick_split_flag[ i ] ) { | |
|       uniform_brick_spacing_flag[ i ] | u(1) |
|       if( uniform__brick_spacing_flag[ i ] ) | |
|         brick_height_minus1[ i ] | ue(v) |
|       else { | |
|         num_brick_rows_minus1[ i ] | ue(v) |
|         for( j = 0; j < num_brick_rows_minus1[ i ]; j++ ) | |
|           brick_row_height_minus1[ i ][ j ] | ue(v) |
|       } | |
|     } | |
|   } | |
|   single_brick_per_slice_flag | u(1) |
|   if( !single_brick_per_slice_flag ) | |
|     rect_slice_flag | u(1) |
|   if( rect_slice_flag && !single_brick_per_slice_flag ) { | |
|     num_slices_in_pic_minus1 | ue(v) |
|     for( i = 0; i <= num_slices_in_pic_minus1; i++ ) { | |
|       if( i > 0 ) | |
|         top_left_brick_idx[ i ] | u(v) |
|       bottom_right_brick_idx_delta[ i ] | u(v) |
|     } | |
|   } | |
|   loop_filter_across_bricks_enabled_flag | u(1) |
|   if( loop_filter_across_bricks_enabled_flag ) | |
|     loop_filter_across_slices_enabled_flag | u(1) |
| } | |
| if( rect_slice_flag ) { | |
|   signalled_slice_id_flag | u(1) |
|   if( signalled_slice_id_flag ) { | |
|     signalled_slice_id_length_minus1 | ue(v) |
|     for( i = 0; i <= num_slices_in_pic_minus1; i++ ) | |
|       slice_id[ i ] | u(v) |
|   } | |
| } | |
| entropy_coding_sync_enabled_flag | u(1) |
| cabac_init_present_flag | u(1) |
| for( i = 0; i < 2; i++ ) | |
|   num_ref_idx_default_active_minus1[ i ] | ue(v) |
| rpl1_idx_present_flag | u(1) |
| init_qp_minus26 | se(v) |
| transform_skip_enabled_flag | u(1) |
| if( transform_skip_enabled_flag ) | |
|   log2_transform_skip_max_size_minus2 | ue(v) |
| cu_qp_delta_enabled_flag | u(1) |
| if( cu_qp_delta_enabled_flag ) | |
|   cu_qp_delta_subdiv | ue(v) |
| pps_cb_qp_offset | se(v) |
| pps_cr_qp_offset | se(v) |
| pps_slice_chroma_qp_offsets_present_flag | ug) |
| weighted_pred_flag | u(1) |
| weighted_bipred_flag | u(1) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|   } | |
| } | |
| pps_loop_filter_across_virtual_boundaries_disabled_flag | u(1) |
| if( pps_loop_filter_across_virtual_boundaries_disabled_flag ) { | |
|   pps_num_ver_virtual_boundaries | u(2) |
|   for( i = 0; i < pps_num_ver_virtual_boundaries; i++ ) | |
|     pps_virtual_boundaries_pos_x[ i ] | u(v) |
|   pps_num_hor_virtual_boundaries | u(2) |
|   for( i = 0; i < pps_num_hor_virtual_boundaries; i++ ) | |
|     pps_virtual_boundaries_pos_y[ i ] | u(v) |
| } | |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

With respect to Table 2, JVET-N1001 provides the following semantics:

pps_pic_parameter_set_id identifies the PPS for reference by other syntax elements. The value of pps_pic_parameter_set_id shall be in the range of 0 to 63, inclusive.

pps_seq_parameter_set_id specifies the value of sps_seq_parameter_set_id for the active SPS. The value of pps_seq_parameter_set_id shall be in the range of 0 to 15, inclusive.

output_flag_present_flag equal to 1 indicates that the pic_output_flag syntax element is present in slice headers referring to the PPS. output_flag_present_flag equal to 0 indicates that the pic_output_flag syntax element is not present in slice headers referring to the PPS.

single_tile_in_pic_flag equal to 1 specifies that there is only one tile in each picture referring to the PPS. single_tile_in_pic_flag equal to 0 specifies that there is more than one tile in each picture referring to the PPS.

NOTE— In absence of further brick splitting within a tile, the whole tile is referred to as a brick. When a picture contains only a single tile without further brick splitting, it is referred to as a single brick.

It is a requirement of bitstream conformance that the value of single_tile_in_pic_flag shall be the same for all PPSs that are activated within a CVS.

uniform_tile_spacing_flag equal to 1 specifies that tile column boundaries and likewise tile row boundaries are distributed uniformly across the picture and signalled using the syntax elements tile_cols_width_minus1 and tile_rows_height_minus1. uniform_tile_spacing_flag equal to 0 specifies that tile column boundaries and likewise tile row boundaries may or may not be distributed uniformly across the picture and signalled using the syntax elements num_tile_columns_minus1 and num_tile_rows_minus1 and a list of syntax element pairs tile_column_width_minus1[i] and tile_row_height_minus1[i]. When not present, the value of uniform_tile_spacing_flag is inferred to be equal to 1.

tile_cols_width_minus1 plus 1 specifies the width of the tile columns excluding the right-most tile column of the picture in units of CTBs when uniform_tile_spacing_flag is equal to 1. The value of tile_cols_width_minus1 shall be in the range of 0 to PicWidthInCtbsY−1, inclusive. When not present, the value of tile_cols_width_minus1 is inferred to be equal to PicWidthInCtbsY−1.

tile_rows_height_minus1 plus 1 specifies the height of the tile rows excluding the bottom tile row of the picture in units of CTBs when uniform_tile_spacing_flag is equal to 1. The value of tile_rows_height_minus1 shall be in the range of 0 to PicHeightInCtbsY−1, inclusive. When not present, the value of tile_rows_height_minus1 is inferred to be equal to PicHeightInCtbsY−1.

num_tile_columns_minus1 plus 1 specifies the number of tile columns partitioning the picture when uniform_tile_spacing_flag is equal to 0. The value of num_tile_columns_minus1 shall be in the range of 0 to PicWidthInCtbsY−1, inclusive. If single_tile_in_pic_flag is equal to 1, the value of num_tile_columns_minus1 is inferred to be equal to 0. Otherwise, when uniform_tile_spacing_flag is equal to 1, the value of num_tile_columns_minus1 is inferred as specified.

num_tile_rows_minus1 plus 1 specifies the number of tile rows partitioning the picture when uniform_tile_spacing_flag is equal to 0. The value of num_tile_rows_minus1 shall be in the range of 0 to PicHeightInCtbsY−1, inclusive. If single_tile_in_pic_flag is equal to 1, the value of num_tile_rows_minus1 is inferred to be equal to 0. Otherwise, when uniform_tile_spacing_flag is equal to 1, the value of num_tile_rows_minus1 is inferred as specified.

The variable NumTilesInPic is set equal to (num_tile_columns_minus1+1)*(num_tile_rows_minus1+1).

When single_tile_in_pic_flag is equal to 0, NumTilesInPic shall be greater than 1.

tile_column_width_minus1[i] plus 1 specifies the width of the i-th tile column in units of CTBs.

tile_row_height_minus1[i] plus 1 specifies the height of the i-th tile row in units of CTBs.

brick_splitting_present_flag equal to 1 specifies that one or more tiles of pictures referring to the PPS may be divided into two or more bricks. brick_splitting_present_flag equal to 0 specifies that no tiles of pictures referring to the PPS are divided into two or more bricks.

brick_split_flag[i] equal to 1 specifies that the i-th tile is divided into two or more bricks. brick_split_flag[i] equal to 0 specifies that the i-th tile is not divided into two or more bricks. When not present, the value of brick_split_flag[i] is inferred to be equal to 0.

uniform_brick_spacing_flag[i] equal to 1 specifies that horizontal brick boundaries are distributed uniformly across the i-th tile and signalled using the syntax element brick_height_minus1[i]. uniform_brick_spacing_flag[i] equal to 0 specifies that horizontal brick boundaries may or may not be distributed uniformly across i-th tile and signalled using the syntax element num_brick_rows_minus1 [i] and a list of syntax elements brick_row_height_minus1[i][j]. When not present, the value of uniform_brick_spacing_flag[i] is inferred to be equal to 1.

brick_height_minus1[i] plus 1 specifies the height of the brick rows excluding the bottom brick in the i-th tile in units of CTBs when uniform_brick_spacing_flag[i] is equal to 1. When present, the value of brick_height_minus1 shall be in the range of 0 to RowHeight[i]−2, inclusive. When not present, the value of brick_height_minus1[i] is inferred to be equal to RowHeight[i]−1.

num_brick_rows_minus1[i] plus 1 specifies the number of bricks partitioning the i-th tile when uniform_brick_spacing_flag[i] is equal to 0. When present, the value of num_brick_rows_minus1[i] shall be in the range of 1 to RowHeight[i]−1, inclusive. If brick split_flag[i] is equal to 0, the value of num_brick_rows_minus1 [i] is inferred to be equal to 0. Otherwise, when uniform_brick_spacing_flag[i] is equal to 1, the value of num_brick_rows_minus1[i] is inferred as specified.

brick_row_height_minus1[i][j] plus 1 specifies the height of the j-th brick in the i-th tile in units of CTBs when uniform_tile_spacing_flag is equal to 0.

The following variables are derived, and, when uniform_tile_spacing_flag is equal to 1, the values of num_tile_columns_minus1 and num_tile_rows_minus1 are inferred, and, for each i ranging from 0 to NumTilesInPic−1, inclusive, when uniform_brick_spacing_flag[i] is equal to 1, the value of num_brick_rows_minus1[i] is inferred, by invoking the CTB raster and brick scanning conversion process as specified:

the list RowHeight[j] for j ranging from 0 to num_tile_rows_minus1, inclusive, specifying the height of the j-th tile row in units of CTBs, the list CtbAddrRsToBs[ctbAddrRs] for ctbAddrRs ranging from 0 to PicSizeInCtbsY−1, inclusive, specifying the conversion from a CTB address in the CTB raster scan of a picture to a CTB address in the brick scan, the list CtbAddrBsToRs[ctbAddrBs] for ctbAddrBs ranging from 0 to PicSizeInCtbsY−1, inclusive, specifying the conversion from a CTB address in the brick scan to a CTB address in the CTB raster scan of a picture, the list BrickId[ctbAddrBs] for ctbAddrBs ranging from 0 to PicSizeInCtbsY−1, inclusive, specifying the conversion from a CTB address in brick scan to a brick ID, the list NumCtusInBrick[brickIdx] for brickIdx ranging from 0 to NumBricksInPic−1, inclusive, specifying the conversion from a brick index to the number of CTUs in the brick, the list FirstCtbAddrBs[brickIdx] for brickIdx ranging from 0 to NumBricksInPic−1, inclusive, specifying the conversion from a brick ID to the CTB address in brick scan of the first CTB in the brick.

single_brick_per_slice_flag equal to 1 specifies that each slice that refers to this PPS includes one brick. single_brick_per_slice_flag equal to 0 specifies that a slice that refers to this PPS may include more than one brick. When not present, the value of single_brickper_slice_flag is inferred to be equal to 1.

rect_slice_flag equal to 0 specifies that bricks within each slice are in raster scan order and the slice information is not signalled in PPS. rect_slice_flag equal to 1 specifies that bricks within each slice cover a rectangular region of the picture and the slice information is signalled in the PPS. When not present, rect_slice_flag is inferred to be equal to 1.

num_slices_in_pic_minus1 plus 1 specifies the number of slices in each picture referring to the PPS. The value of num_slices_in_pic_minus1 shall be in the range of 0 to NumBricksInPic−1, inclusive. When not present and single_brick_per_slice_flag is equal to 1, the value of num_slices_in_pic_minus1 is inferred to be equal to NumBricksInPic−1.

top_left_brick_idx[i] specifies the brick index of the brick located at the top-left corner of the i-th slice. The value of top_left_brick_idx[i] shall not be equal to the value of top_left_brick_idx[j] for any i not equal to j. When not present, the value of top_left_brick_idx[i] is inferred to be equal to i. The length of the top_left_brick_idx[i] syntax element is Ceil(Log 2(NumBricksInPic) bits.

bottom_right_brick_idx_delta[i] specifies the difference between the brick index of the brick located at the bottom-right corner of the i-th slice and top_left_brick_idx[i]. When single_brick_per_slice_flag is equal to 1, the value of bottom_right_brick_idx_delta[i] is inferred to be equal to 0. The length of the bottom_right_brick_idx_delta[i] syntax element is Ceil(Log 2(NumBricksInPic−top_left_brick_idx[i])) bits.

It is a requirement of bitstream conformance that a slice shall include either a number of complete tiles or only a consecutive sequence of complete bricks of one tile.

The variable NumBricksInSlice[i] and BricksToSliceMap [j], which specify the number of bricks in the i-th slice and the mapping of bricks to slices, are derived as follows:

```
NumBricksInSlice[ i ] = 0
botRightBkIdx = top_left_brick_idx[ i ] +
bottom_right_brick_idx_delta[ i ]
for( j = 0; j < NumBricksInPic; j++) {
   if( BrickColBd[ j ] >= BrickColBd[ top_left_brick_idx[ i ] ] &&
      BrickColBd[ j ] <= BrickColBd[ botRightBkIdx ] &&
      BrickRowBd[ j ] >= BrickRowBd[ top_left_brick_idx[ i ] ]
&&
      BrickRowBd[ j ] <= BrickRowBd [ botRightBkIdx ]) {
      NumBricksInSlice[ i ]++
      BricksToSliceMap[ j ] = i
   }
}
``` loop_filter_across_bricks_enabled_flag equal to 1 specifies that in-loop filtering operations may be performed across brick boundaries in pictures referring to the PPS. loop_filter_across_bricks_enabled_flag equal to 0 specifies that in-loop filtering operations are not performed across brick boundaries in pictures referring to the PPS. The in-loop filtering operations include the deblocking filter, sample adaptive offset filter, and adaptive loop filter operations. When not present, the value of loop_filter_across_bricks_enabled_flag is inferred to be equal to 1.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.

signalled_slice_id_flag equal to 1 specifies that the slice ID for each slice is signalled. signalled_slice_id_flag equal to 0 specifies that slice IDs are not signalled. When rect_slice_flag is equal to 0, the value of signalled_slice_id_flag is inferred to be equal to 0.

signalled_slice_id_length_minus1 plus 1 specifies the number of bits used to represent the syntax element slice_id [i] when present, and the syntax element slice_address in slice headers. The value of signalled_slice_id_length_minus1 shall be in the range of 0 to 15, inclusive. When not present, the value of signalled_slice_id_length_minus1 is inferred to be equal to Ceil(Log 2(+1))−1.

slice_id[i] specifies the slice ID of the i-th slice. The length of the slice_id[i] syntax element is signalled_slice_id_length_minus1+1 bits. When not present, the value of slice_id[i] is inferred to be equal to i, for each i in the range of 0 to num_slices_in_pic_minus1, inclusive.

entropy_coding_sync_enabled_flag equal to 1 specifies that a specific synchronization process for context variables is invoked before decoding the CTU that includes the first CTB of a row of CTBs in each brick in each picture referring to the PPS, and a specific storage process for context variables is invoked after decoding the CTU that includes the first CTB of a row of CTBs in each brick in each picture referring to the PPS. entropy_coding_sync_enabled_flag equal to 0 specifies that no specific synchronization process for context variables is required to be invoked before decoding the CTU that includes the first CTB of a row of CTBs in each brick in each picture referring to the PPS, and no specific storage process for context variables is required to be invoked after decoding the CTU that includes the first CTB of a row of CTBs in each brick in each picture referring to the PPS.

It is a requirement of bitstream conformance that the value of entropy_coding_sync_enabled_flag shall be the same for all PPSs that are activated within a CVS.

cabac_init_present_flag equal to 1 specifies that cabac_init_flag is present in slice headers referring to the PPS. cabac_init_present_flag equal to 0 specifies that cabac_init_flag is not present in slice headers referring to the PPS.

num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0.

The value of num_ref_idx_default_active_minus1[i] shall be in the range of 0 to 14, inclusive.

rpl1_idx_present_flag equal to 0 specifies that ref_pic_list_sps_flag[1] and ref_pic_list_idx[1] are not present in slice headers. rpl1_idx_present_flag equal to 1 specifies that ref_pic_list_sps_flag[1] and ref_pic_list_idx[1] may be present in slice headers.

init_qp_minus26 plus 26 specifies the initial value of SliceQp$_Y$ for each slice referring to the PPS. The initial value of SliceQp$_Y$ is modified at the slice layer when a non-zero value of slice_qp_delta is decoded. The value of init_qp_minus26 shall be in the range of −(26+QpBdOffset$_Y$) to +37, inclusive.

transform_skip_enabled_flag equal to 1 specifies that transform_skip_flag may be present in the transform unit syntax. transform_skip_enabled_flag equal to 0 specifies that transform_skip_flag is not present in the transform unit syntax.

log2_transform_skip_max_size_minus2 specifies the maximum block size used for transform skip, and shall be in the range of 0 to 3.

When not present, the value of log2_transform_skip_max_size_minus2 is inferred to be equal to 0.

The variable MaxTsSize is set equal to 1<<(log2_transform_skip_max_size_minus2+2).

cu_qp_delta_enabled_flag equal to 1 specifies that the cu_qp_delta_subdiv syntax element is present in the PPS and that cu_qp_delta_abs may be present in the transform unit syntax. cu_qp_delta_enabled_flag equal to 0 specifies that the cu_qp_delta_subdiv syntax element is not present in the PPS and that cu_qp_delta_abs is not present in the transform unit syntax.

cu_qp_delta_subdiv specifies the maximum cbSubdiv value of coding units that convey cu_qp_delta_abs and cu_qp_delta_sign_flag. The value range of cu_qp_delta_subdiv is specified as follows:

If slice_type is equal to I, the value of cu_qp_delta_subdiv shall be in the range of 0 to 2*(log2_ctu_size_minus2−log2_min_qt_size_intra_slice_minus2+MaxMttDepthY), inclusive.

Otherwise (slice_type is not equal to I), the value of cu_qp_delta_subdiv shall be in the range of 0 to 2*(log2_ctu_size_minus2−log2_min_qt_size_inter_slice_minus2+MaxMttDepthY), inclusive.

When not present, the value of cu_qp_delta_subdiv is inferred to be equal to 0.

pps_cb_qp_offset and pps_cr_qp_offset specify the offsets to the luma quantization parameter Qp'$_Y$ used for deriving Qp'$_{Cb}$ and Qp'$_{Cr}$ respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value.

pps_slice_chroma_qp_offsets_present_flag equal to 1 indicates that the slice_cb_qp_offset and slice_cr_qp_offset syntax elements are present in the associated slice headers. pps_slice_chroma_qp_offsets_present_flag equal to 0 indicates that these syntax elements are not present in the associated slice headers. When ChromaArrayType is equal to 0, pps_slice_chroma_qp_offsets_present_flag shall be equal to 0.

weighted_pred_flag equal to 0 specifies that weighted prediction is not applied to P slices. weighted_pred_flag equal to 1 specifies that weighted prediction is applied to P slices.

weighted_bipred_flag equal to 0 specifies that the default weighted prediction is applied to B slices. weighted_bipred_flag equal to 1 specifies that weighted prediction is applied to B slices.

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of deblocking_filter_override_flag in the slice headers for pictures referring to the PPS. deblocking_filter_override_enabled_flag equal to 0 specifies the absence of deblocking_filter_override_flag in the slice headers for pictures referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied for slices referring to the PPS, unless the default deblocking parameter offsets are overridden by the deblocking parameter offsets present in the slice headers of the slices referring to the PPS. The values of pps_beta_offset_div2 and pps_tc_offset_div2 shall both be in the range of −6 to 6, inclusive. When not present, the value of pps_beta_offset_div2 and pps_tc_offset_div2 are inferred to be equal to 0.

pps_loop_filter_aeross_virtual_boundaries_disabled_flag equal to 1 specifies that the in-loop filtering operations are disabled across the virtual boundaries in pictures referring to the PPS. pps_loop_filter_across_virtual_boundaries_disabled_flag equal to 0 specifies that no such disabling of in-loop filtering operations is applied in pictures referring to the PPS. The in-loop filtering operations include the deblocking filter, sample adaptive offset filter, and adaptive loop filter operations. When not present, the value of pps_loop_filter_across_virtualboundaries_disabled_flag is inferred to be equal to 0.

pps_num_ver_virtual_boundaries specifies the number of pps_virtual_boundaries_pos_x[i] syntax elements that are present in the PPS. When pps_num_ver_virtual_boundaries is not present, it is inferred to be equal to 0.

pps_virtual_boundaries_pos_x[i] is used to compute the value of PpsVirtualBoundariesPosX[i], which specifies the location of the i-th vertical virtual boundary in units of luma samples. The number of bits used to represent pps_virtual_boundaries_pos_x[i] is Ceil(Log2(pic_width_in_luma_samples)−3). pps_virtual_boundaries_pos_x[i] shall be in the range of 1 to Ceil(pic_width_in_luma_samples÷8)−1, inclusive.

The location of the vertical virtual boundary PpsVirtualBoundariesPosX[i] is derived as follows:

$$PpsVirtualBoundariesPosX[i]=pps\_virtual\_boundaries\_pos\_x[i]*8$$

The distance between any two vertical virtual boundaries shall be greater than or equal to CtbSizeY luma samples.

pps_num_hor_virtual_boundaries specifies the number of pps_virtual_boundaries_pos_y[i] syntax elements that are present in the PPS. When pps_num_hor_virtual_boundaries is not present, it is inferred to be equal to 0.

pps_virtual_boundaries_pos_y[i] is used to compute the value of PpsVirtualBoundariesPosY[i], which specifies the location of the i-th horizontal virtual boundary in units of luma samples. The number of bits used to represent pps_virtual_boundaries_pos_y[i] is Ceil(Log2(pic_height_in_luma_samples)−3). pps_virtual_boundaries_pos_y[i] shall be in the range of 1 to Ceil(pic_height_in_luma_samples÷8)−1, inclusive.

The location of the horizontal virtual boundary PpsVirtualBoundariesPosY[i] is derived as follows:

*Pps*VirtualBoundariesPos*Y*[*i*]=*pps*_virtual_boundaries_pos_*y*[*i*]*8

The distance between any two horizontal virtual boundaries shall be greater than or equal to CtbSizeY luma samples.

pps_extension_flag equal to 0 specifies that no pps_extension_dataflag syntax elements are present in the PPS RBSP syntax structure. pps_extension_flag equal to 1 specifies that there are pps_extension_data_flag syntax elements present in the PPS RBSP syntax structure.

pps_extension_data_flag may have any value. Its presence and value do not affect decoder conformance to profiles specified in this version of this Specification. Decoders conforming to this version of this Specification shall ignore all pps_extension_data_flag syntax elements.

Figure 5:
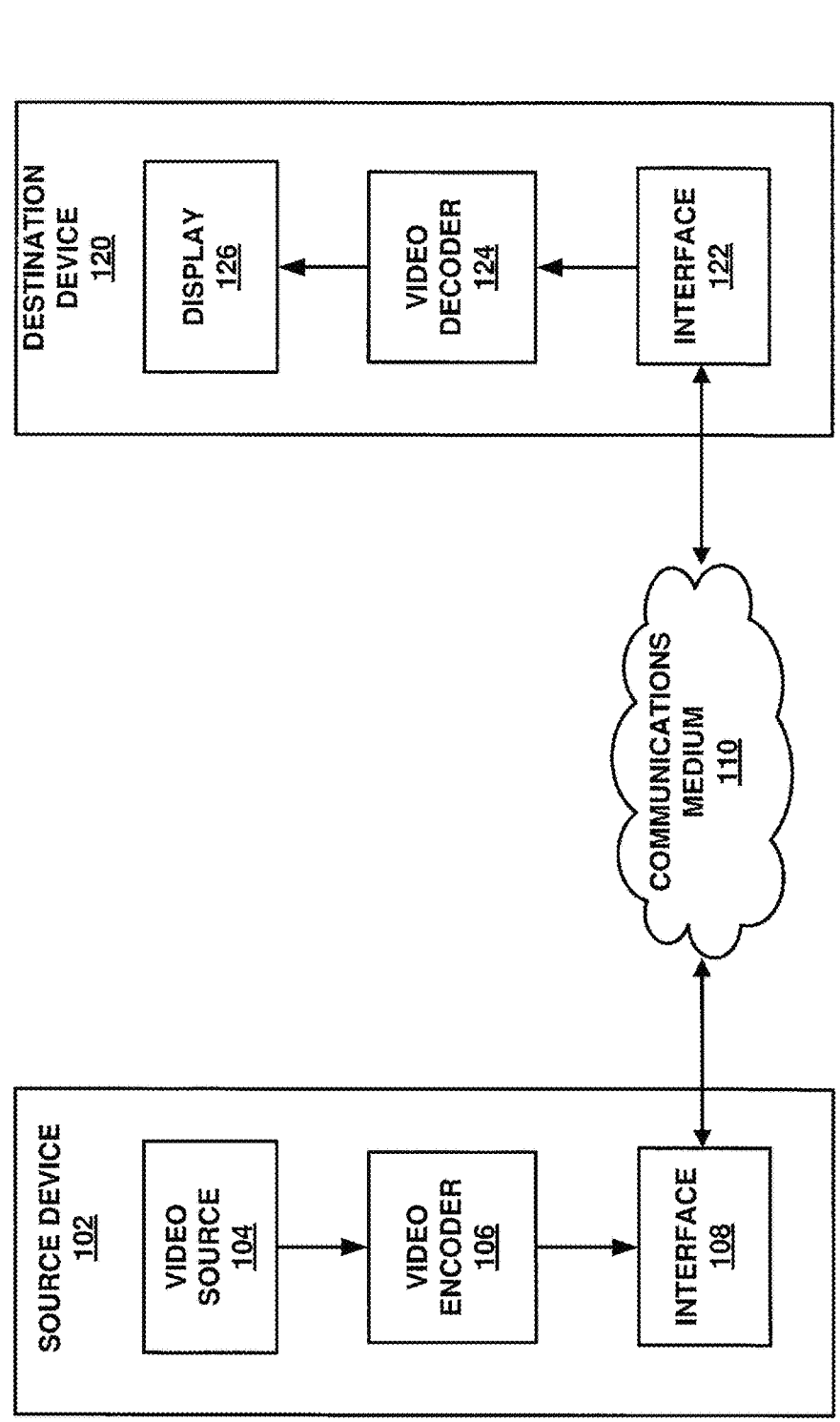
FIG. 5 is a block diagram illustrating an example of a system that may be configured to encode and decode video data according to one or more techniques of this disclosure.

FIG. 5 is a block diagram illustrating an example of a system that may be configured to code (i.e., encode and/or decode) video data according to one or more techniques of this disclosure. System 100 represents an example of a system that may perform video coding using partitioning techniques described according to one or more techniques of this disclosure. As illustrated in FIG. 5, system 100 includes source device 102, communications medium 110, and destination device 120. In the example illustrated in FIG. 5, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 5, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I²C, or any other logical and physical structure that may be used to interconnect peer devices.

Referring again to FIG. 5, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 3, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
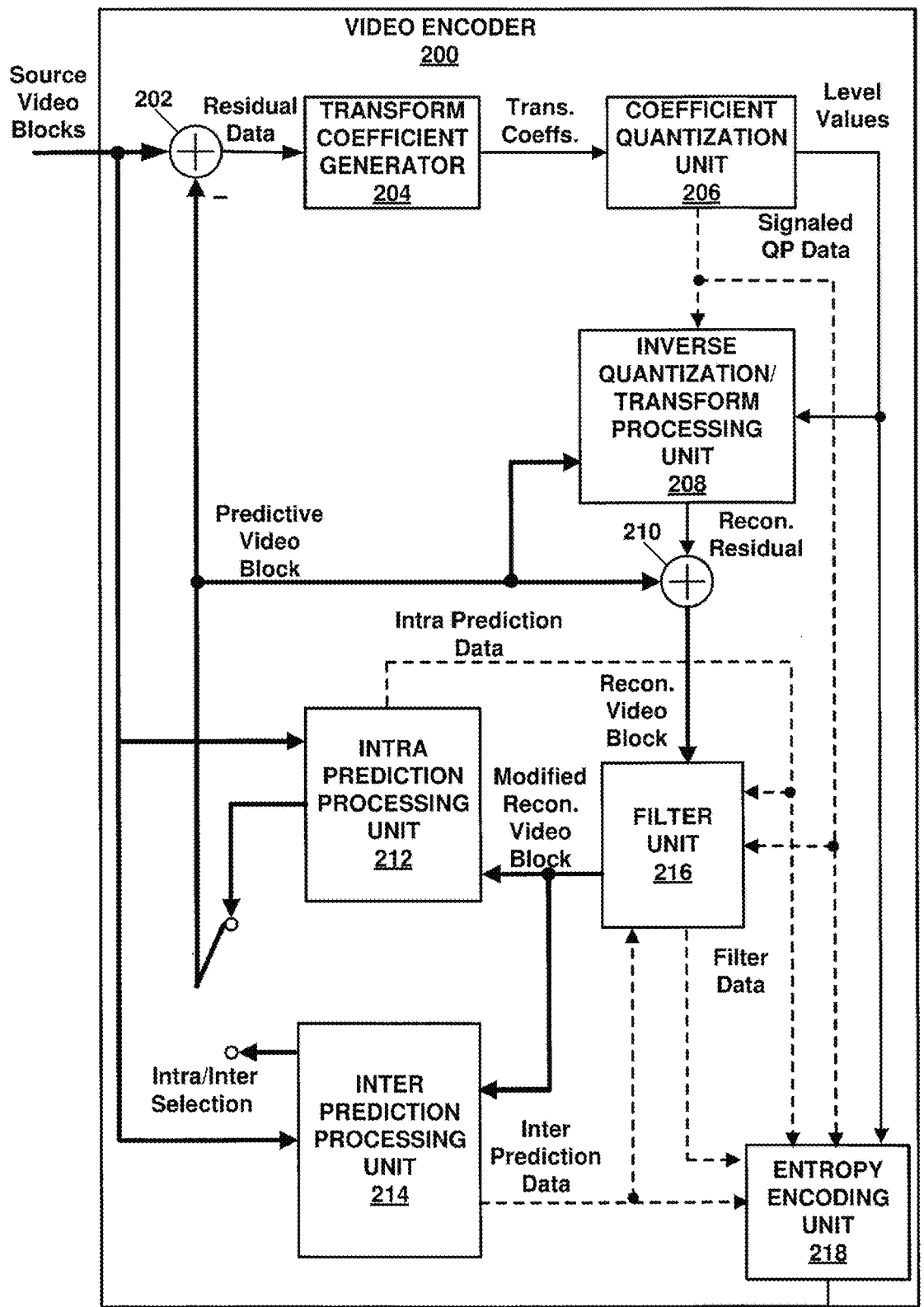
FIG. 6 is a block diagram illustrating an example of a video encoder that may be configured to encode video data according to one or more techniques of this disclosure.

FIG. 6 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 6, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional sub-divisions of source video blocks. It should be noted that some techniques described herein may be generally applicable to video coding, regardless of how source video data is partitioned prior to and/or during encoding. In the example illustrated in FIG. 6, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 6, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. As described above, in ITU-T H.265, TBs are restricted to the following sizes 4×4, 8×8, 16×16, and 32×32. In one example, transform coefficient generator 204 may be configured to perform transformations according to arrays having sizes of 4×4, 8×8, 16×16, and 32×32. In one example, transform coefficient generator 204 may be further configured to perform transformations according to arrays having other dimensions. In particular, in some cases, it may be useful to perform transformations on rectangular arrays of difference values. In one example, transform coefficient generator 204 may be configured to perform transformations according to the following sizes of arrays: 2×2, 2×4N, 4M×2, and/or 4M×4N. In one example, a 2-dimensional (2D) M×N inverse transform may be implemented as 1-dimensional (1D) M-point inverse transform followed by a 1D N-point inverse transform. In one example, a 2D inverse transform may be implemented as a 1D N-point vertical transform followed by a 1D N-point horizontal transform. In one example, a 2D inverse transform may be implemented as a 1D N-point horizontal transform followed by a 1D N-point vertical transform. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization parameter. Coefficient quantization unit 206 may be further configured to determine quantization parameters and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As described above, using Table 1 for deriving a $Qp_C$ value as described above with respect to JVET-N1001 may be less than ideal. In one example, according to the techniques herein, coefficient quantization unit 206 may be configured to derive a quantization parameters according to a piece-wise linear function which may be encoded in a bitstream for derivation of the quantization parameter at video decoder. In one example, syntax elements included in a parameter set, for example, a PPS, may specify a mapping table for luma to chroma QP values. It should be noted that, as described above, NET-N1001 includes the following five types of parameter sets: decoding parameter set (DPS), video parameter set (VPS), sequence parameter set (SPS), picture parameter set (PPS), and adaption parameter set (APS). Thus, according to the techniques herein, syntax elements specifying a mapping table for luma to chroma QP values (or mapping table(s) for any component to component QP values) may be included in one or more of decoding parameter set (DPS), video parameter set (VPS), sequence parameter set (SPS), picture parameter set (PPS), and adaption parameter set (APS). In one example, according to the techniques herein, a picture parameter set syntax structure may include the syntax in Table 3. For example, the syntax included in Table 3 may be added to the picture parameter set syntax structure provided above in Table 2. For example, the syntax included in Table 3 may be added to the picture parameter set syntax structure provided above in Table 2 immediately following syntax element pps_slice_chroma_qp_offsets_present_flag.

TABLE 3

| | Descriptor |
|---|---|
| pic_parameter_set_rbsp( ) { | |
| ... | |
|   qp_luma_to_chroma_map_present_flag | u(1) |
|   if( qp_luma_to_chroma_map_present_flag ) { | |
|     qp_luma_to_chroma_joint_map_flag | u(1) |
|     for( i = 0; i < ( qp_luma_to_chroma_joint_map_flag ? 1 : 3 ); i++ ) { | |
|       qp_map_num_points_minus1[ i ] | u(6) |
|       for( j = 0; j <= qp_map_num_points_minus1[ i ]; j++ ) { | |
|         if( j == 0 ) | |
|           qp_map_pivot_delta_minus26[ i ] | se(v) |
|         else | |
|           qp_map_pivot_delta_minus1[ i ][ j ] | ue(v) |
|         qp_map_delta[ i ][ j ] | se(v) |
|       } | |
|     } | |
|     if( qp_luma_to_chroma_joint_map_flag ) { | |
|       for( int i = 0; i < 3; i++ ) | |
|         qp_map_offset[ i ] | se(v) |
|     } | |
|   } | |
| ... | |

In one example, the semantics of syntax elements qp_luma_to_chroma_map_present_flag, qp_luma_to_chroma_joint_map_flag, qp_map_num_points_minus1[i], qp_map_pivot_delta_minus26[i], qp_map_pivot_delta_minus1[i][j], qp_map_delta[i][j] and qp_map_offset[i] may be based on the following:

qp_luma_to_chroma_map_present_flag specifies whether a luma-to-chroma quantization parameter mapping table is present.

qp_luma_to_chroma_joint_map_flag specifies whether a common luma-to-chroma quantization parameter mapping table is used for Cb, Cr and CbCr.

qp_map_num_points_minus1[i], qp_map_pivot_delta_minus26[i], qp_map_pivot_delta_minus1[i][j], qp_map_delta[i][j] and qp_map_offset[i] define a piece-wise linear function for mapping a luma QP value to a chroma QP value.

Values of a mapping table qp_map[i][j] are derived therefrom as follows:

```
for( i = 0; i < 3; i++) {
  minQp = −24 // minimum for 12-bit content
  maxQp = 69
  k = qp_luma_to_chroma_joint_map_flag ? 0 : i
  pivot = qp_map_pivot_delta_minus26[ k ] + 26
  for( j = 0; j <= qp_map_num_points_minus1[ k ]; j++ ) {
    if( j > 0 )
      pivot = pivot + qp_map_pivot_delta_minus1[ k ][ j ] + 1
    qp_map_pivot[ j ] = Clip3( minQp, maxQp, pivot )
  }
  offset = qp_luma_to_chroma_joint_map_flag ? qp_map_offset[ i ] : 0
  for( qp = minQp; qp < qp_map_pivot[ 0 ]; qp++ ) {
    qp_map[ i ][ qp ] = qp + qp_map_delta[ k ][ 0 ] + offset
  }
  for( j = 0; j < qp_map_num_points_minus1[ i ]; j++ ) {
    slope_num = qp_map_delta[ k ][ j + 1 ] − qp_map_delta[ k ][ j ]
    slope_den = qp_map_pivot[ j + 1 ] − qp_map_pivot[ j ];
    for( qp = qp_map_pivot[ j ]; qp < qp_map_pivot[ j + 1 ]; qp++ ) {
      offset1 = qp − qp_map_pivot[ j ]
      qp_map[ i ][ qp ] = qp + qp_map_delta[ k ][ j ] + Floor( slope_num * offset1 / slope_den + 0.5 ) + offset
    }
  }
  for( qp = qp_map_pivot[ qp_map_num_points_minus1[ k ] ]; qp <= maxQp; qp++ ) {
    qp_map[ i ][ qp ] = qp + qp_map_delta[ k ][ qp_map_num_points_minus1[ k ] ] + offset
  }
}
```

When qp_luma_to_chroma_map_present_flag is false, and parameters for the piece-wise function are not present, qp_map[i][qp]=qp for i=0 ... 2 and qp=−24 ... 69.

In one example, the values of qp_map_delta[i][j] may also be differentially coded for reduced bit consumption, where a delta_qp_map_delta[i][j] syntax element is encoded instead of qp_map_delta[i][j]. In one example, in this case, according to the techniques herein, a picture parameter set syntax structure may include the syntax in Table 4. For example, the syntax included in Table 4 may be added to the picture parameter set syntax structure provided above in Table 2. For example, the syntax included in Table 4 may be added to the picture parameter set syntax structure provided above in Table 2 immediately following syntax element pps_slice_chroma_qp_offsets_present_flag.

| | Descriptor |
|---|---|
| pic_parameter_set_rbsp( ) { | |
| ... | |
|   qp_luma_to_chroma_map_present_flag | u(1) |
|   if( qp_luma_to_chroma_map_present_flag ) { | |
|     qp_luma_to_chroma_joint_map_flag | u(1) |
|     for( i = 0; i < ( qp_luma_to_chroma_joint_map_flag ? 1 : 3 ); i++ ) { | |
|       qp_map_num_points_minus1[ i ] | u(6) |
|       for( j = 0; j <= qp_map_num_points_minus1[ i ]; j++ ) { | |
|         if( j = 0 ) | |
|           qp_map_pivot_delta_minus26[ i ] | se(v) |
|         else | |
|           qp_map_pivot_delta_minus1[ i ][ j ] | ue(v) |
|         delta_qp_map_delta[ i ][ j ] | se(v) |
|       } | |
|     } | |
|     if( qp_luma_to_chroma_joint_map_flag ) { | |
|       for( int i = 0; i < 3; i++ ) | |
|         qp_map_offset[ i ] | se(v) |
|     } | |
|   } | |
| ... | |

With respect to Table 4, in one example, the semantics of syntax elements qp_luma_to_chroma_map_present_flag, qp_luma_to_chroma_joint_map_flag, qp_map_num_points_minus1[i], qp_map_pivot_delta_minus26[i], qp_map_pivot_delta_minus1[i][j], delta_qp_map_delta[i][j] and qp_map_offset[i] may be based on the following:

qp_luma_to_chroma_map_present_flag specifies whether a luma-to-chroma quantization parameter mapping table is present.

qp_luma_to_chroma_joint_map_flag specifies whether a common luma-to-chroma quantization parameter mapping table is used for Cb, Cr and CbCr.

qp_map_num_points_minus1[i], qp_map_pivot_delta_minus26[i], qp_map_pivot_delta_minus1[i][j], delta_qp_map_delta[i][j] and qp_map_offset[i] define a piece-wise linear function for mapping a luma QP value to a chroma QP value. Values of a mapping table qp_map[i][j] are derived therefrom as follows:

```
for( i = 0; i < 3; i++) {
    minQp = −24 // minimum for 12-bit content
    maxQp = 69
    k = qp_luma_to_chroma_joint_map_flag ? 0 : i
    pivot = qp_map_pivot_delta_minus26[ k ] + 26
    z = 0
    for( j = 0; j <= qp_map_num_points_minus1[ k ]; j++ ) {
        if( j > 0 )
            pivot = pivot + qp_map_pivot_delta_minus1[ k ][ j ] + 1
        qp_map_delta[j] = z + delta_qp_map_delta[j]
        z = qp_map_delta[j]
        qp_map_pivot[ j ] = Clip3( minQp, maxQp, pivot )
    }
    qp_offset = qp_luma_to_chroma_joint_map_flag ? qp_map_offset[ i ] : 0
    for( qp = minQp; qp < qp_map_pivot[ 0 ]; qp++ ) {
        qp_map[ i ][ qp ] = qp + qp_map_delta[ k ][ 0 ] + qp_offset
    }
    for( j = 0; j < qp_map_num_points_minus1[ i ]; j++ ) {
        slope_num = qp_map_delta[ k ][ j + 1 ] − qp_map_delta[ k ][ j ]
        slope_den = qp_map_pivot[ j + 1 ] − qp_map_pivot[ j ];
        for( qp = qp_map_pivot[ j ]; qp < qp_map_pivot[ j + 1 ]; qp++ ) {
            offset = qp − qp_map_pivot[ j ]
            qp_map[ i ][ qp ] = qp + qp_map_delta[ k ][ j ] + Floor( slope_num * offset / slope_den + 0.5 ) + qp_offset
        }
    }
    for( qp = qp_map_pivot[ qp_map_num_points_minus1[ k ] ]; qp <= maxQp; qp++ ) {
        qp_map[ i ][ qp ] = qp + qp_map_delta[ k ][ qp_map_num_points_minus1[k ] ] + qp_offset
    }
}
```

When qp_luma_to_chroma_map_present_flag is false, and parameters for the piece-wise function are not present, qp_map[i][qp]=qp for i=0 ... 2 and qp=−24 ... 69.

In some examples, some syntax elements may be encoded using uek(v) bit representation, which may increase coding efficiency, where uek(v) is an unsigned integer k-th order Exp-Golomb-coded syntax element with the left bit first. In one example, the parsing process for this descriptor may be as follows with the order k defined in the semantics of the syntax element:

This process is invoked when the descriptor of a syntax element in the syntax tables is equal to ue(v), uek(v) or se(v).

Inputs to this process are bits from the RBSP.

Outputs of this process are syntax element values.

Syntax elements coded as ue(v) or se(v) are Exp-Golomb-coded with order k equal to 0 and syntax elements coded as uek(v) are Exp-Golomb-coded with order k. The parsing process for these syntax elements begins with reading the bits starting at the current location in the bitstream up to and including the first non-zero bit, and counting the number of leading bits that are equal to 0. This process is specified as follows:

leadingZeroBits=−1 for(b=0; !b; leadingZeroBits++)
    b=read_bits(1)

The variable codeNum is then assigned as follows:

codeNum=($2^{leadingZeroBits}$−1)*$2^k$+read_bits(leadingZeroBits+k)

where the value returned from read_bits(leadingZeroBits) is interpreted as a binary representation of an unsigned integer with most significant bit written first.

Table 5 illustrates the structure of the 0-th order Exp-Golomb code by separating the bit string into "prefix" and "suffix" bits. The "prefix" bits are those bits that are parsed as specified above for the computation of leadingZeroBits, and are shown as either 0 or 1 in the bit string column of Table 5. The "suffix" bits are those bits that are parsed in the computation of codeNum and are shown as x, in Table 5, with i in the range of 0 to leadingZeroBits−1, inclusive. Each $x_i$ is equal to either 0 or 1.

TABLE 5

| Bit string form | Range of codeNum |
| --- | --- |
| 1 | 0 |
| 0 1 $x_0$ | 1 . . . 2 |
| 0 0 1 $x_1$ $x_0$ | 3 . . . 6 |
| 0 0 0 1 $x_2$ $x_1$ $x_0$ | 7 . . . 14 |
| 0 0 0 0 1 $x_3$ $x_2$ $x_1$ $x_0$ | 15 . . . 30 |
| 0 0 0 0 0 1 $x_4$ $x_3$ $x_2$ $x_1$ $x_0$ | 31 . . . 62 |
| . . . | . . . |

Table 6 illustrates explicitly the assignment of bit strings to codeNum values.

TABLE 6

| Bit string | codeNum |
| --- | --- |
| 1 | 0 |
| 0 1 0 | 1 |
| 0 1 1 | 2 |
| 0 0 1 0 0 | 3 |

TABLE 6-continued

| Bit string | codeNum |
| --- | --- |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

Depending on the descriptor, the value of a syntax element is derived as follows:

If the syntax element is coded as ue(v), the value of the syntax element is equal to codeNum.

Otherwise (the syntax element is coded as se(v)), the value of the syntax element is derived by invoking the mapping process for signed Exp-Golomb codes as specified with codeNum as input.

Mapping Process for Signed Exp-Golomb Codes

Input to this process is codeNum as specified.

Output of this process is a value of a syntax element coded as se(v).

The syntax element is assigned to the codeNum by ordering the syntax element by its absolute value in increasing order and representing the positive value for a given absolute value with the lower codeNum. Table 7 provides the assignment rule.

TABLE 7

| codeNum | syntax element value |
| --- | --- |
| 0 | 0 |
| 1 | 1 |
| 2 | −1 |
| 3 | 2 |
| 4 | −2 |
| 5 | 3 |
| 6 | −3 |
| k | $(-1)^{k+1}$ Ceil(k ÷ 2) |

In one example, according to the techniques herein, a picture parameter set syntax structure may include the syntax in Table 8. For example, the syntax included in Table 4 may be added to the picture parameter set syntax structure provided above in Table 8. For example, the syntax included in Table 4 may be added to the picture parameter set syntax structure provided above in Table 8 immediately following syntax element pps_slice_chroma_qp_offsets_present_flag. It should be noted that in Table 8, the bit representation of delta_qp_map_delta is modified to account for the fact that the mapping table generally maps a given luma QP value to a smaller chroma QP value.

| | Descriptor |
| --- | --- |
| pic_parameter_set_rbsp( ) { | |
| ... | |
| qp_luma_to_chroma_map_present_flag | u(1) |
| if( qp_luma_to_chroma_map_present_flag ) { | |
|   qp_luma_to_chroma_joint_map_flag | u(1) |
|   for( i = 0; i < ( qp_luma_to_chroma_joint_map_flag ? 1 : 3 ); i++ ) { | |
|     qp_map_num_points_minus1[ i ] | uek(v) |
|     for( j = 0; j <= qp_map_num_points_minus1[ i ]; j++ ) { | |
|       if( j == 0 ) { | |
|         qp_map_pivot_delta_minus26[ i ] | se(v) |
|         qp_map_delta[ i ] | se(v) |
|       } else { | |

-continued

|  | Descriptor |
|---|---|
|       qp_map_pivot_delta_minus1[ i ][ j ] | uek(v) |
|       delta_qp_map_delta[ i ][ j ] | uek(v) |
|     } |  |
|   } |  |
| } |  |
| if( qp_luma_to_chroma_joint_map_flag ) { |  |
|   for( int i = 0; i < 3; i++ ) |  |
|     qp_map_offset[ i ] | se(v) |
| } |  |
| } |  |
| ... |  |

With respect to Table 8, in one example, the semantics of syntax elements qp_luma_to_chroma_map_present_flag, qp_luma_to_chroma_joint_map_flag, qp_map_num_points_minus1[i], qp_map_pivot_delta_minus26[i], qp_map_delta[i], qp_map_pivot_delta_minus1[i][j], delta_qp_map_delta[i][j] and qp_map_offset[i] may be based on the following:

qp_luma_to_chroma_map_present_flag specifies whether a luma-to-chroma quantization parameter mapping table is present.

qp_luma_to_chroma_joint_map_flag specifies whether a common luma-to-chroma quantization parameter mapping table is used for Cb, Cr and CbCr.

qp_map_num_points_minus1[i], qp_map_pivot_delta_minus26[i], qp_map_pivot_delta_minus1[i][j], qp_map_delta[i], delta_qp_map_delta[i][j] and qp_map_offset[i] define a piece-wise linear function for mapping a luma QP value to a chroma QP value. The order k of the exp-Golomb binarization uek(v) is 2 for qp_map_num_points_minus1 and for qp_map_pivot_delta_minus1[i][j], and 1 for delta_qp_map_delta[i][j].

Values of a mapping table qp_map[i][j] are derived therefrom as follows:

When qp_luma_to_chroma_map_present_flag is false, and parameters for the piece-wise function are not present, qp_map[i][qp]=qp for i=0 . . . 2 and qp=−24 . . . 69.

It should be noted that syntax element qp_map_num_points_minus1 plus 1 specifies the number of points used to describe the chroma QP mapping table. Thus, according to the techniques herein, a syntax element specifying the number of points used to describe a chroma QP mapping table may be encoded using a uek(v) bit representation, where in one example, the order k of the exp-Golomb binarization uek(v) is 2. It should be noted that qp_map_pivot_delta_minus1[i][j] plus 1 specifies a delta value used to derive the input coordinate of the j-th pivot point of the i-th chroma QP mapping table. Thus, according to the techniques herein, a syntax element specifying a delta value used to derive the input coordinate of a pivot point of a chroma QP mapping table may be encoded using a uek(v) bit representation, where in one example, the order k of the exp-Golomb binarization uek(v) is 2. Further, it should be noted that in one example, the order k of the exp-Golomb binarization uek(v) for qp_map_pivot_delta_minus1[i][j] may be 3 for j 0, and 2 otherwise. It should be noted that delta_qp_map_delta[i][j] specifies a delta value used to

```
for( i = 0; i < 3; i++) {
  minQp = −24 // minimum for 12-bit content
  maxQp = 69
  k = qp_luma_to_chroma_joint_map_flag ? 0 : i
  pivot = qp_map_pivot_delta_minus26[ k ] + 26
  for( j = 0; j <= qp_map_num_points_minus1[ k ]; j++ ) {
    if( j > 0 ) {
      dx = qp_map_pivot_delta_minus1[ k ][ j ] + 1
      dy = delta_qp_map_delta[j]
      pivot = pivot + dx
      qp_map_delta[j] = qp_map_delta[j − 1] + (dy <= dx ? -dy : dy − dx)
    }
    qp_map_pivot[ j ] = Clip3( minQp, maxQp, pivot )
  }
  qp_offset = qp_luma_to_chroma_joint_map_flag ? qp_map offset[ i ] : 0
  for( qp = minQp; qp < qp_map_pivot[ 0 ]; qp++ ) {
    qp_map[ i ][ qp ] = qp + qp_map_delta[ k ][ 0 ] + qp_offset
  }
  for( j = 0; j < qp_map_num_points_minus1[ i ]; j++ ) {
    slope_num = qp_map_delta[ k ][ j + 1] − qp_map_delta[ k ][ j ]
    slope_den = qp_map_pivot[ j + 1 ] − qp_map_pivot[ j ];
    for( qp = qp_map_pivot[ j ]; qp < qp_map_pivot[ j + 1 ]; qp++ ) {
      offset = qp − qp_map_pivot[ j ]
      qp_map[ i ][ qp ] = qp + qp_map_delta[ k ][ j ] + Floor( slope_num * offset / slope_den + 0.5 ) + qp_offset
    }
  }
  for( qp = qp_map_pivot[ qp_map_num_points_minus1[ k ] ]; qp <= maxQp; qp++ ) {
    qp_map[ i ][ qp ] = qp + qp_map_delta[ k ][ qp_map_num_points_minus1[ k ] ] + qp_offset
  }
}
``` derive the output coordinate of the j-th pivot point of the i-th chroma QP mapping table. Thus, according to the techniques herein, a syntax element specifying a delta value used to derive an output coordinate of a pivot point of a chroma QP mapping table may be encoded using a uek(v) bit representation, where in one example, the order k of the exp-Golomb binarization uek(v) is 1.

It should be noted that syntax element qp_map_pivot_delta_minus26[i] plus 26 specifies the input coordinate of the first pivot point of the i-th chroma QP mapping table. Thus, according to the techniques herein, a syntax element specifying the input coordinate of the first pivot point of a chroma QP mapping table may be encoded using se(v) encoding. It should be noted that syntax element qp_map_delta specifies a delta value used to derive the output coordinate of the first pivot point of the i-th chroma QP mapping table. Thus, according to the techniques herein, a syntax element specifying a delta value used to derive the output coordinate of the first pivot point of a chroma QP mapping table may be encoded using se(v) encoding.

In one example, according to the techniques herein, a picture parameter set syntax structure may include the syntax in Table 9.

|  | Descriptor |
|---|---|
| pic_parameter_set_rbsp( ) { | |
| ... | |
|   qp_luma_to_chroma_map_present_flag | u(1) |
|   if( qp_luma_to_chroma_map_present_flag ) { | |
|     qp_luma_to_chroma_joint_map_flag | u(1) |
|     for( i = 0; i < (qp_luma_to_chroma_joint_map_flag ? 1 : 3 ); i++) { | |
|       qp_map_num_points_minus1[ i ] | ue(v) |
|       for(j = 0; j <= qp_map_num_points_minus1[ i ]; j++ ) { | |
|         if( j == 0 ) { | |
|           qp_map_pivot_delta_minus26[ i ] | se(v) |
|           qp_map_delta[ i ] | se(v) |
|         } else { | |
|           qp_map_pivot_delta_minus1[ i ][ j ] | ue(v) |
|           delta_qp_map_delta[ i ][ j ] | ue(v) |
|         } | |
|       } | |
|     } | |
|     if( qp_luma_to_chroma_joint_map_flag ) { | |
|       for( int i = 0; i < 3; i++ ) | |
|         qp_map_offset[ i ] | se(v) |
|     } | |
|   } | |
| ... | |

With respect to Table 9, in one example, the semantics of syntax elements qp_luma_to_chroma_map_present_flag, qp_luma_to_chroma_joint_map_flag, qp_map_num_points_minus1[i], qp_map_pivot_delta_minus26[i], qp_map_delta[i], qp_map_pivot_delta_minus1[i][j], delta_qp_map_delta[i][j] and qp_map_offset[i] may be based on the following:

qp_luma_to_chroma_map_present_flag specifies whether a luma-to-chroma quantization parameter mapping table is present.

qp_luma_to_chroma_joint_map_flag specifies whether a common luma-to-chroma quantization parameter mapping table is used for Cb, Cr and CbCr.

qp_map_num_points_minus1[i], qp_map_pivot_delta_minus26[i], qp_map_pivot_delta_minus1[i][j], qp_map_delta[i], delta_qp_map_delta[i][j] and qp_map_offset[i] define a piece-wise linear function for mapping a luma QP value to a chroma QP value. The order k of the exp-Golomb binarization uek(v) is 2 for qp_map_num_points_minus1 and for qp_map_pivot_delta_minus1 [i][j], and 1 for delta_qp_map_delta[i][j].

Values of a mapping table qp_map[i][j] are derived therefrom as follows:

```
for( i = 0; i < 3; i++) {
  minQp = -24 // minimum for 12-bit content
  maxQp = 69
  k = qp_luma_to_chroma_joint_map_flag ? 0 : i
  pivot = qp_map_pivot_delta_minus26[ k ] + 26
  for( j = 0; j <= qp_map_num_points_minus1[ k ]; j++ ) {
    if( j > 0 ) {
      dx = qp_map_pivot_delta_minus1[ k ][ j ] + 1
      dy = delta_qp_map_delta[j]
```

```
      pivot = pivot + dx
      qp_map_delta[j] = qp_map_delta[j - 1] + (dy <= dx - 1 ? dx - 1 -dy : dy) - dx
    }
    qp_map_pivot[ j ] = Clip3( minQp, maxQp, pivot )
  }
  qp_offset = qp_luma_to_chroma_joint_map_flag ? qp_map_offset[ i ] : 0
  for( qp = minQp; qp < qp_map_pivot[ 0 ]; qp++ ) {
    qp_map[ i ][ qp ] = qp + qp_map_delta[ k ][ 0 ] + qp_offset
  }
  for( j = 0; j < qp_map_num_points_minus1[ i ]; j++ ) {
    slope_num = qp_map_delta[ k ][ j + 1 ] - qp_map_delta[ k ][ j ]
    slope_den = qp_map_pivot[ j + 1 ] - qp_map_pivot[ j ];
    for( qp = qp_map_pivot[ j ]; qp < qp_map_pivot[ j + i ]; qp++ ) {
      offset = qp - qp_map_pivot[ j ]
      qp_map[ i ][ qp ] = qp + qp_map_delta[ k ][ j ] + Floor( slope_num * offset / slope_den
+ 0.5 ) + qp_offset
    }
  }
  for( qp = qp_map_pivot[ qp_map_num_points_minus1[ k ] ]; qp <= maxQp; qp++ ) {
    qp_map[ i ][ qp ] = qp + qp_map_delta[ k ][ qp_map_num_points_minus1[ k ] ] +
qp_offset
  }
}
```

When qp_luma_to_chroma_map_present_flag is false, and parameters for the piece-wise function are not present, qp map[i][qp]=qp for i=0 . . . 2 and qp=−24 . . . 69.

Alternatively qp_map_delta[j] may also be derived as:

$$qp\_map\_delta[j]=qp\_map\_delta[j-1]+(dy \wedge (dx-1))-dx$$

where ^ is the bit-wise exclusive or operator. This may be beneficial from a complexity point of view as fewer operations are required.

In one example, according to the techniques herein, coefficient quantization unit 206 may be configured to derive a quantization parameters according to the following process:

Inputs to this process are:
- a luma location (xCb, yCb) specifying the top-left luma sample of the current coding block relative to the top-left luma sample of the current picture,
- a variable cbWidth specifying the width of the current coding block in luma samples,
- a variable cbHeight specifying the height of the current coding block in luma samples,
- a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location (xQg, yQg), specifies the top-left luma sample of the current quantization group relative to the top left luma sample of the current picture. The horizontal and vertical positions xQg and yQg are set equal to CuQgTopLeftX and CuQgTopLeftY, respectively.

NOTE—: The current quantization group is a rectangular region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PRED}$ is derived as follows:
   If one or more of the following conditions are true, $qP_{Y\_PREV}$ is set equal to $SliceQp_Y$:
   The current quantization group is the first quantization group in a slice.
   The current quantization group is the first quantization group in a brick.
   Otherwise, $qP_{Y\_PREV}$ is set equal to the luma quantization parameter $Qp_Y$ of the last luma coding unit in the previous quantization group in decoding order.

2. The availability derivation process for a block is invoked with the location (xCurr, yCurr) set equal to (xCb, yCb) and the neighbouring location (xNbY, yNbY) set equal to (xQg−1, yQg) as inputs, and the output is assigned to availableA. The variable $qP_{Y\_A}$ is derived as follows:
   If one or more of the following conditions are true, $qP_{Y\_A}$ is set equal to $qP_{Y\_PREV}$:
   availableA is equal to FALSE.
   the CTB address ctbAddrA of the CTB containing the luma coding block covering the luma location (xQg−1, yQg) is not equal to CtbAddrinBs, where ctbAddrA is derived as follows:

$xTmp=(xQg-1)>>MinTbLog2SizeY$ $yTmp=yQg>>MinTbLog2SizeY$ $minTbAddrA=MinTbAddrZs[xTmp][yTmp]$ $ctbAddrA=minTbAddrA>>(2*(CtbLog2SizeY-MinTbLog2SizeY))$ Otherwise, $qP_{Y\_A}$ is set equal to the luma quantization parameter $Qp_Y$ of the coding unit containing the luma coding block covering (xQg−1, yQg).

3. The availability derivation process for a block as specified is invoked with the location (xCurr, yCurr) set equal to (xCb, yCb) and the neighbouring location (xNbY, yNbY) set equal to (xQg, yQg−1) as inputs, and the output is assigned to availableB. The variable $qP_{Y\_B}$ is derived as follows:
   If one or more of the following conditions are true, $qP_{Y\_B}$ is set equal to $qP_{Y\_PREV}$:
   availableB is equal to FALSE.
   the CTB address ctbAddrB of the CTB containing the luma coding block covering the luma location (xQg, yQg−1) is not equal to CtbAddrInBs, where ctbAddrB is derived as follows:

$x\text{Tmp}=xQg\text{>>MinTbLog2Size}Y$ $y\text{Tmp}=(yQg-1)\text{>>MinTbLog2Size}Y$ $\text{minTbAddr}B=\text{MinTbAddrZs}[x\text{Tmp}][y\text{Tmp}]$ $\text{ctbAddr}B=\text{minTbAddr}B\text{>>}(2*(\text{CtbLog2Size}Y-\text{MinTbLog2Size}_Y))$ Otherwise, $qP_{Y\_B}$ is set equal to the luma quantization parameter $Qp_Y$ of the coding unit containing the luma coding block covering (xQg, yQg−1).

4. The predicted luma quantization parameter $qP_{Y\_PRED}$ is derived as follows:
   If all the following conditions are true, then $qP_{Y\_PRED}$ is set equal to the luma quantization parameter $Qp_Y$ of the coding unit containing the luma coding block covering (xQg, yQg−1):
      availableB is equal to TRUE.
      the current quantization group is the first quantization group in a CTB row within a tile
   Otherwise, $qP_{Y\_PRED}$ is derived as follows:

$qP_{Y\_PRED}=(qP_{Y\_A}+qP_{Y\_B}+1)\text{>>}1$

The variable $Qp_Y$ is derived as follows:

$Qp_Y=((qP_{Y\_PRED}+CuQp\text{DeltaVal}+64+2*QpBd\text{Offset}_Y)\%(64+QpBd\text{Offset}_Y))-QpBd\text{Offset}_Y$ The luma quantization parameter $Qp'_Y$ is derived as follows:

$Qp'_Y=Qp_Y+QpBd\text{Offset}_Y$

When ChromaArrayType is not equal to 0 and treeType is equal to SINGLE_TREE or DUAL_TREE_CHROMA, the following applies:
   When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).
   The variables $qP_{Cb}$, $qP_{Cr}$, and $qP_{CbCr}$ are derived as follows:

$qPi_{Cb}=\text{Clip3}(-24,69,Qp_Y+pps\_cb\_qp\_\text{offset}+slice\_cb\_qp\_\text{offset})$ $qPi_{Cr}=\text{Clip3}(-24,69,Qp_Y+pps\_cr\_qp\_\text{offset}+slice\_cr\_qp\_\text{offset})$ $qPi_{CbCr}=\text{Clip3}(-24,69,Qp_Y+pps\_joint\_cbcr\_qp\_\text{offset}+slice\_joint\_cbcr\_qp\_\text{offset})$ $qP_{Cb}=\text{Clip3}(-QpBd\text{Offset}_C,63,qp\_map[0][qPi_{Cb}])$ $qP_{Cr}=\text{Clip3}(-QpBd\text{Offset}_C,63,qp\_map[1][qPi_{Cr}])$ $qP_{CbCr}=\text{Clip3}(-QpBd\text{Offset}_C,63,qp\_map[2][qPi_{CbCr}])$ The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb}=qP_{Cb}+QpBd\text{Offset}_C$ $Qp'_{Cr}=qP_{Cr}+QpBd\text{Offset}_C$ $Qp'_{CbCr}=qP_{CbCr}+QpBd\text{Offset}_C$ It should be noted that the piece-wise linear function may yield fractional chroma QP values, which is then rounded to the nearest integer to become the actual chroma QP value. In one example, video encoder 200 may be configured to consider the full-precision value of the piece-wise linear function to derive lambda parameters for chroma. In some cases, such a consideration may yield smoother RD curves where the Cb PSNR is plotted against bitrate and luma QP.

In this manner, video encoder 200 represents an example of a device configured to determine a quantization parameter for a chroma component of a current video block based at least in part on a piece-wise linear function and perform quantization based on the determined quantization parameter.

Referring again to FIG. 6, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 6, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 6, intra prediction processing unit 212 outputs intra prediction data (e.g., syntax elements) to entropy encoding unit 218 and transform coefficient generator 204. As described above, a transform performed on residual data may be mode dependent. As described above, possible intra prediction modes may include planar prediction modes, DC prediction modes, and angular prediction modes. Further, in some examples, a prediction for a chroma component may be inferred from an intra prediction for a luma prediction mode. Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU (or similar coding structure) of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 6). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218. As illustrated in FIG. 6, inter prediction processing unit 214 may receive reconstructed video block via filter unit 216.

Referring again to FIG. 6, filter unit 216 receives reconstructed video blocks and coding parameters and outputs modified reconstructed video data. Filter unit 216 may be configured to perform deblocking, Sample Adaptive Offset (SAO) filtering, Adaptively Loop Filtering (ALF), etc. SAO filtering is a non-linear amplitude mapping that may be used to improve reconstruction by adding an offset to reconstructed video data. It should be noted that as illustrated in FIG. 5, intra prediction processing unit 212 and inter prediction processing unit 214 may receive modified reconstructed video block via filter unit 216. Entropy encoding unit 218 receives quantized transform coefficients and predictive syntax data (i.e., intra prediction data and motion prediction data). Entropy encoding unit 218 may be configured to perform entropy encoding according to one or more of the techniques described herein.

Figure 7:
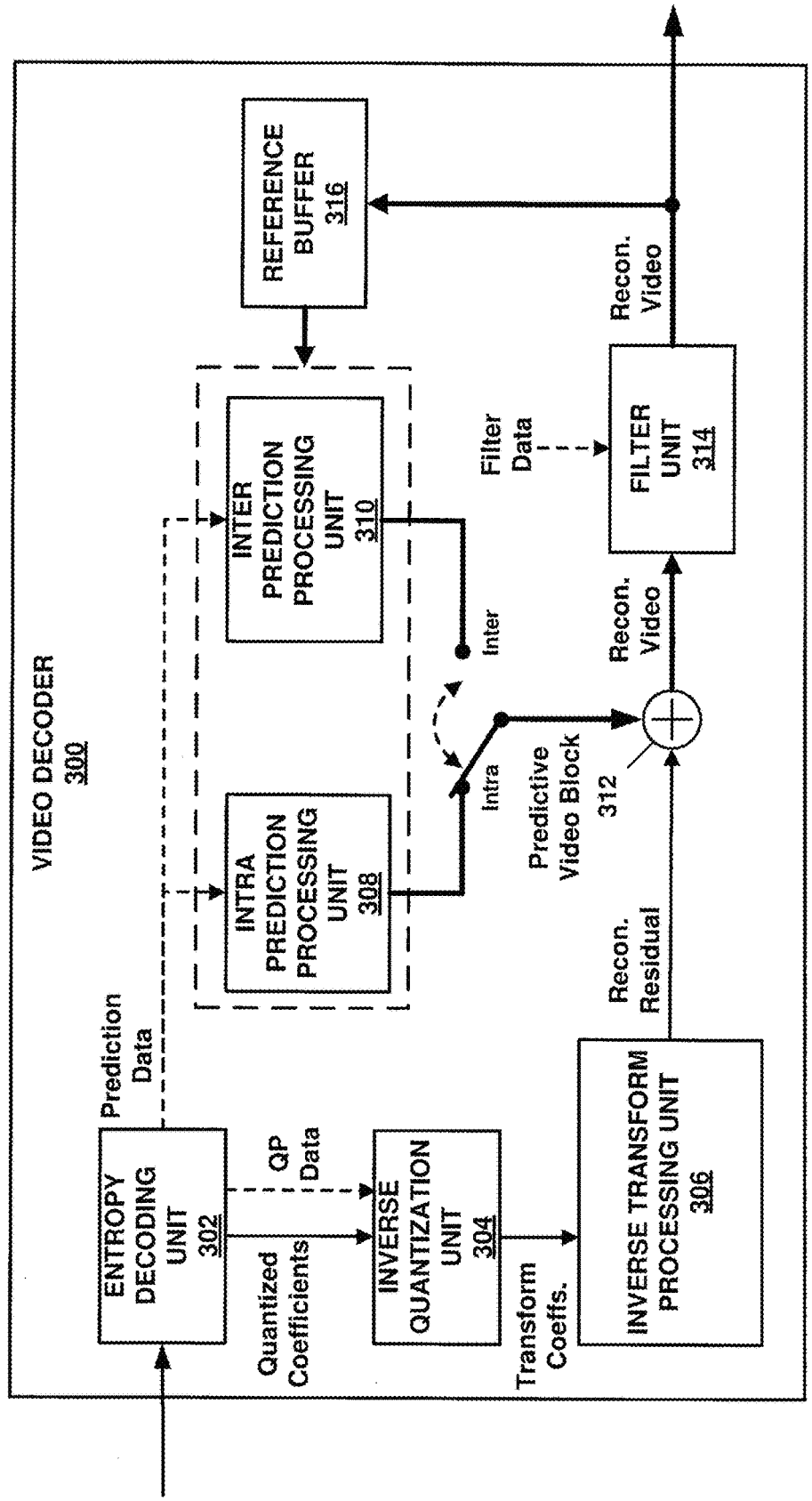
FIG. 7 is a block diagram illustrating an example of a video decoder that may be configured to decode video data according to one or more techniques of this disclosure.

FIG. 7 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 7 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 7, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above.

Referring again to FIG. 7, inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. For example, inverse quantization unit 304 may be configured to infer predetermined values), allowed quantization group sizes, derive quantization parameters, and the like, according to the techniques described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 7, reconstructed residual data may be provided to summer 312. Summer 312 may add reconstructed residual data to a predictive video block and generate reconstructed video data. A predictive video block may be determined according to a predictive video technique (i.e., intra prediction and inter frame prediction).

Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block. Filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 7, a reconstructed video block may be output by video decoder 300. In this manner, video decoder 300 represents an example of a device configured to determine a quantization parameter for a chroma component of a current video block based at least in part on a piece-wise linear function and perform quantization based on the determined quantization parameter.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY

In one example, a method of coding of video data, the method comprising: determining a quantization parameter for a chroma component of a current video block based at least in part on a piece-wise linear function; and performing quantization based on the determined quantization parameter.

In one example, the method, further comprising signaling the piece-wise linear function in a parameter set.

In one example, the method, wherein determining a quantization parameter for a chroma component of a current video block based at least in part on a piece-wise linear function includes parsing syntax elements defining the piece-wise linear function from a parameter set.

In one example, a device for coding video data, the device comprising one or more processors configured to perform any and all combinations of the steps.

In one example, the device, wherein the device includes a video encoder.

In one example, the device, wherein the device includes a video decoder.

In one example, a system comprising: the device includes a video encoder; and the device includes a video decoder.

In one example, an apparatus for coding video data, the apparatus comprising means for performing any and all combinations of the steps.

In one example, a non-transitory computer-readable storage medium comprising instructions stored thereon that, when executed, cause one or more processors of a device for coding video data to perform any and all combinations of the steps.

In one example, a method of decoding video data, the method comprising: decoding a syntax element specifying a number of points used to describe a quantization parameter mapping table in a parameter set; decoding a quantization parameter mapping table syntax element in the parameter set; and decoding a delta quantization parameter minus one syntax element and a delta quantization parameter syntax element in the parameter set, wherein: a first pivot is set to a value of the quantization parameter mapping table syntax element plus 26, a second pivot is set to a sum of a value of the first pivot and a value of the delta quantization parameter minus one syntax element plus one, and the quantization parameter mapping table is derived by using the second pivot, the syntax element specifying a number of points used to describe the quantization parameter mapping table and the delta quantization parameter syntax element.

In one example, the method, further comprising: deriving a chroma quantization parameter by using a quantization parameter; and deriving a chroma blue quantization parameter by using the quantization parameter mapping table defined by the chroma quantization parameter.

In one example, a method of coding video data, the method comprising: coding a syntax element specifying a number of points used to describe a quantization parameter mapping table in a parameter set; coding a quantization parameter mapping table syntax element in the parameter set; and coding a delta quantization parameter minus one syntax element and a delta quantization parameter syntax element in the parameter set, wherein: a first pivot is set to a value of the quantization parameter mapping table syntax element plus 26, a second pivot is set to a sum of a value of the first pivot and a value of the delta quantization parameter minus one syntax element plus one, and the quantization parameter mapping table is derived by using the second pivot, the syntax element specifying a number of points used to describe the quantization parameter mapping table and the delta quantization parameter syntax element.

In one example, a device for decoding coded data, the device comprising: a processor, and a memory associated with the processor; wherein the processor is configured to perform the following steps: decoding a syntax element specifying a number of points used to describe a quantization parameter mapping table in a parameter set; decoding a quantization parameter mapping table syntax element in the parameter set; and decoding a delta quantization parameter minus one syntax element and a delta quantization parameter syntax element in the parameter set, wherein: a first pivot is set to a value of the quantization parameter mapping table syntax element plus 26, a second pivot is set to a sum of a value of the first pivot and a value of the delta quantization parameter minus one syntax element plus one, and the quantization parameter mapping table is derived by using the second pivot, the syntax element specifying a number of points used to describe the quantization parameter mapping table and the delta quantization parameter syntax element.

In one example, a device for coding video data, the device comprising: a processor, and a memory associated with the processor; wherein the processor is configured to perform the following steps: coding a syntax element specifying a number of points used to describe a quantization parameter mapping table in a parameter set; coding a quantization parameter mapping table syntax element in the parameter set; and coding a delta quantization parameter minus one syntax element and a delta quantization parameter syntax element in the parameter set, wherein: a first pivot is set to a value of the quantization parameter mapping table syntax element plus 26, a second pivot is set to a sum of a value of the first pivot and a value of the delta quantization parameter minus one syntax element plus one, and the quantization parameter mapping table is derived by using the second pivot, the syntax element specifying a number of points used to describe the quantization parameter mapping table and the delta quantization parameter syntax element.

The invention claimed is:
1. A method of decoding video data, the method comprising:
  decoding (i) a number of points syntax element, (ii) a quantization parameter mapping table syntax element, (iii) a delta quantization parameter minus one syntax element, and (iv) a delta quantization parameter syntax element in a parameter set, wherein the number of points syntax element, the quantization parameter mapping table syntax element, the delta quantization parameter minus one syntax element, and the delta quantization parameter syntax element are used for mapping a luma quantization parameter to chroma quantization parameters; and
  deriving an i-th chroma quantization parameter mapping table by using the number of points syntax element, the quantization parameter mapping table syntax element, the delta quantization parameter minus one syntax element, and the delta quantization parameter syntax element;
  wherein:
  a j-th pivot point for an i-th chroma quantization parameter mapping table is set equal to a value of the quantization parameter mapping table syntax element plus 26. if a value j is equal to zero,
  a (j+1)-th pivot point for the i-th chroma quantization parameter mapping table is set equal to a sum of a value of the i-th pivot point, a value of the delta quantization parameter minus one syntax element and one,
  a j-th value for the i-th chroma quantization parameter mapping table is derived by using the i-th pivot point,
  a (j+1)-th value for the i-th chroma quantization parameter mapping table is derived by using the i-th value and the delta quantization parameter syntax element,
  the (j+1)-th pivot point and the (i+1)-th value are derived for the value j in a range from zero to a value of the number of points syntax element, and
  the i-th chroma quantization parameter mapping table, which is defined by using the j-th pivot point, is derived based on the (j+1)-th value and the delta quantization parameter minus one syntax element.
2. A method of coding video data, the method comprising:
  coding (i) a number of points syntax element, (ii) a quantization parameter mapping table syntax element, (iii) a delta quantization parameter minus one syntax element, and (iv) a delta quantization parameter syntax element, in a parameter set, wherein the number of points syntax element, the quantization parameter mapping table syntax element, the delta quantization parameter minus one syntax element, and the delta quantization parameter syntax element are used for mapping a luma quantization parameter to chroma quantization parameters; and
  deriving an i-th chroma quantization parameter mapping table by using the number of points syntax element, the quantization parameter mapping table syntax element, the delta quantization parameter minus one syntax element, and the delta quantization parameter syntax element;
  wherein:
  a i-th pivot point for an i-th chroma quantization parameter mapping table is set equal to a value of the quantization parameter mapping table syntax element plus 26, if a value i is equal to zero, a (j+1)-th pivot point for the i-th chroma quantization parameter mapping table is set equal to a sum of a value of the j-th pivot point, a value of the delta quantization parameter minus one syntax element and one, a j-th value for the i-th chroma quantization parameter mapping table is derived by using the i-th pivot point, a (j+1)-th value for the i-th chroma quantization parameter mapping table is derived by using the i-th value and the delta quantization parameter syntax element, the (j+1)-th pivot point and the (j+1)-th value are derived for the value j in a range from zero to a value of the number of points syntax element, and the i-th chroma quantization parameter mapping table, which is defined by using the i-th pivot point, is derived based on the (j+1)-th value and the delta quantization parameter minus one syntax element.

3. A device for decoding coded data, the device comprising:

a processor, and a memory associated with the processor; wherein the processor is configured to:

decode (i) a number of points syntax element, (ii) a quantization parameter mapping table syntax element, (iii) a delta quantization parameter minus one syntax element, and (iv) a delta quantization parameter syntax element, in a parameter set, wherein the number of points syntax element, the quantization parameter mapping table syntax element, the delta quantization parameter minus one syntax element, and the delta quantization parameter syntax element are used for mapping a luma quantization parameter to chroma quantization parameters; and derive an i-th chroma quantization parameter mapping table by using the number of points syntax element, the quantization parameter mapping table syntax element, the delta quantization parameter minus one syntax element, and the delta quantization parameter syntax element;

wherein:

a i-th pivot point for an i-th chroma quantization parameter mapping table is set equal to a value of the quantization parameter mapping table syntax element plus 26, if a value j is equal to zero, a (j+1)-th pivot point for the i-th chroma quantization parameter mapping table is set equal to a sum of a value of the i-th pivot point, a value of the delta quantization parameter minus one syntax element and one, a i-th value for the i-th chroma quantization parameter mapping table is derived by using the j-th pivot point, a (j+1)-th value for the i-th chroma quantization parameter mapping table is derived by using the i-th value and the delta quantization parameter syntax element, the (j+1)-th pivot point and the (j+1)-th value are derived for the value j in a range from zero to a value of the number of points syntax element, and the i-th chroma quantization parameter mapping table, which is defined by using the i-th pivot point, is derived based on the (j+1)-th value and the delta quantization parameter minus one syntax element.

4. A device for coding video data, the device comprising:

a processor, and a memory associated with the processor; wherein the processor is configured to:

code (i) a number of points syntax element, (ii) a quantization parameter mapping table syntax element, (iii) a delta quantization parameter minus one syntax element, and (iv) a delta quantization parameter syntax element, in a parameter set, wherein the number of points syntax element, the quantization parameter mapping table syntax element, the delta quantization parameter minus one syntax element, and the delta quantization parameter syntax element are used for mapping a luma quantization parameter to chroma quantization parameters; and derive an i-th chroma quantization parameter mapping table by using the number of points syntax element, the quantization parameter mapping table syntax element, the delta quantization parameter minus one syntax element, and the delta quantization parameter syntax element;

wherein:

a i-th pivot point for an i-th chroma quantization parameter mapping table is set equal to a value of the quantization parameter mapping table syntax element plus 26, if a value i is equal to zero, a (j+1)-th pivot point for the i-th chroma quantization parameter mapping table is set equal to a sum of a value of the i-th pivot point, a value of the delta quantization parameter minus one syntax element and one, a i-th value for the i-th chroma quantization parameter mapping table is derived by using the i-th pivot point, a (j+1)-th value for the i-th chroma quantization parameter mapping table is derived by using the i-th value and the delta quantization parameter syntax element, the (j+1)-th pivot point and the (j+1)-th value are derived for the value i in a range from zero to a value of the number of points syntax element, and the i-th chroma quantization parameter mapping table, which is defined by using the i-th pivot point, is derived based on the (j+1)-th value and the delta quantization parameter minus one syntax element.

\* \* \* \* \*